(12) United States Patent
Kim et al.

(10) Patent No.: US 12,613,606 B2
(45) Date of Patent: Apr. 28, 2026

(54) ELECTRONIC DEVICE FOR ADAPTIVELY CHANGING REPRESENTATION OF IMAGE ACCORDING TO CHANGE IN DISPLAY AREA OF ROLLABLE DISPLAY

(71) Applicant: SAMSUNG ELECTRONICS CO., LTD., Suwon-si (KR)

(72) Inventors: Moonjeong Kim, Suwon-si (KR); Raetae Kim, Suwon-si (KR); Yangwook Kim, Suwon-si (KR); Wankyu Kim, Suwon-si (KR); Gyeongtae Park, Suwon-si (KR); Sunghwan Park, Suwon-si (KR); Jookwan Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 70 days.

(21) Appl. No.: 17/967,122

(22) Filed: Oct. 17, 2022

(65) Prior Publication Data

US 2023/0185420 A1     Jun. 15, 2023

Related U.S. Application Data

(63) Continuation of application No. PCT/KR2022/014117, filed on Sep. 21, 2022.

(30) Foreign Application Priority Data

Dec. 14, 2021     (KR) ........................ 10-2021-0179014
Jan. 25, 2022     (KR) ........................ 10-2022-0010462

(51) Int. Cl.
*G06F 3/0481* (2022.01)
*G06F 1/16* (2006.01)
(Continued)

(52) U.S. Cl.
CPC .......... *G06F 3/0481* (2013.01); *G06F 1/1652* (2013.01); *G06F 3/0484* (2013.01); *G06F 3/04886* (2013.01)

(58) Field of Classification Search
CPC .... G06F 3/0481; G06F 1/1652; G06F 3/0484; G06F 3/04886
See application file for complete search history.

(56) References Cited

U.S. PATENT DOCUMENTS 9,041,648 B2     5/2015  Lee et al.
9,041,696 B2     5/2015  Kwack et al.
(Continued)

FOREIGN PATENT DOCUMENTS

EP          1751632  B1      9/2013
JP      2014137779  A       7/2014
(Continued)

OTHER PUBLICATIONS

European Office Action corresponding to Application No. 22907633.6-1218; Dated Aug. 6, 2025.
(Continued)

*Primary Examiner* — William L Bashore
*Assistant Examiner* — Gregory A Distefano
(74) *Attorney, Agent, or Firm* — CANTOR COLBURN LLP

(57) ABSTRACT

An electronic device according to an embodiment may comprise: a housing; a memory configured to store instructions; a display slidable into the housing or slidable out of the housing; and at least one processor, when the instructions are executed, configured to: identify, while an image is displayed in a display area of the display exposed outside the housing, an event in which the display area exposed outside the housing is extended; and change, in response to the identification, a representation of the image based on at least
(Continued)

one of a direction in which the display area is extended or a speed at which the display area is extended, while the display area is extended.

21 Claims, 24 Drawing Sheets

(51) Int. Cl.

| | | |
|---|---|---|
| *G06F 3/0484* | (2022.01) | |
| *G06F 3/04886* | (2022.01) | |

(56) References Cited

U.S. PATENT DOCUMENTS

| | | | | | |
|---|---|---|---|---|---|
| 9,152,180 | B2 | 10/2015 | Kim | | |
| 9,589,529 | B2 | 3/2017 | Kim | | |
| 10,747,269 | B1* | 8/2020 | Choi | ...................... | G06F 1/1641 |
| 10,817,022 | B2 | 10/2020 | Cho et al. | | |
| 10,860,201 | B2 | 12/2020 | Kang et al. | | |
| 11,057,514 | B1 | 7/2021 | Noh et al. | | |
| 11,106,358 | B2 | 8/2021 | Yoon et al. | | |
| 11,238,832 | B2 | 2/2022 | An et al. | | |
| 12,336,119 | B2 | 6/2025 | Park et al. | | |
| 2011/0227822 | A1* | 9/2011 | Shai | ...................... | G09G 5/003 |
| | | | | | 345/156 |
| 2013/0275910 | A1* | 10/2013 | Kim | ...................... | G06F 1/1652 |
| | | | | | 715/800 |
| 2014/0002419 | A1* | 1/2014 | Thorson | ................ | G06F 1/1652 |
| | | | | | 345/175 |
| 2014/0204037 | A1* | 7/2014 | Kim | .......................... | G06F 3/03 |
| | | | | | 345/173 |
| 2014/0218375 | A1* | 8/2014 | Kim | ...................... | G06F 1/1643 |
| | | | | | 345/501 |
| 2014/0282231 | A1* | 9/2014 | Foreman | ................ | G06F 9/451 |
| | | | | | 715/792 |

| | | | | | |
|---|---|---|---|---|---|
| 2016/0349971 | A1 | 12/2016 | Chi et al. | | |
| 2016/0378270 | A1 | 12/2016 | Lee et al. | | |
| 2017/0061932 | A1* | 3/2017 | Kwon | .................... | G06F 1/1626 |
| 2017/0168769 | A1* | 6/2017 | Jeon | ...................... | G06F 1/1652 |
| 2017/0196102 | A1 | 7/2017 | Shin et al. | | |
| 2018/0335939 | A1* | 11/2018 | Karunamuni | .......... | G06F 9/445 |
| 2019/0261519 | A1* | 8/2019 | Park | .................... | H04M 1/0235 |
| 2021/0026413 | A1 | 1/2021 | Kwak et al. | | |
| 2021/0337049 | A1 | 10/2021 | Noh et al. | | |
| 2022/0391158 | A1* | 12/2022 | Lemmens | ............. | G06F 3/1438 |
| 2023/0213973 | A1* | 7/2023 | Xu | ...................... | G06F 3/04842 |
| | | | | | 345/55 |

FOREIGN PATENT DOCUMENTS

| | | | |
|---|---|---|---|
| KR | 20140095347 | A | 8/2014 |
| KR | 20140100149 | A | 8/2014 |
| KR | 20140135404 | A | 11/2014 |
| KR | 101649156 | B1 | 8/2016 |
| KR | 20160123201 | A | 10/2016 |
| KR | 20160139320 | A | 12/2016 |
| KR | 20170000553 | A | 1/2017 |
| KR | 20170043374 | A | 4/2017 |
| KR | 20180126440 | A | 11/2018 |
| KR | 20190101184 | A | 8/2019 |
| KR | 102047692 | B1 | 11/2019 |
| KR | 20210068272 | A | 6/2021 |
| KR | 20210072584 | A | 6/2021 |
| KR | 20210148396 | A | 12/2021 |
| WO | 2017119529 | A1 | 7/2017 |
| WO | 2021132757 | A1 | 7/2021 |

OTHER PUBLICATIONS

India First Examination Report corresponding to Application No. 202447045966; Dated Aug. 5, 2025.
Notice of Grouds For Rejection, issued on Jan. 13, 2026.

* cited by examiner

200

311

201

310

321

202

"A"

320

330

IDENTIFY EVENT    402

CHANGE, WHILE DISPLAY AREA OF DISPLAY IS EXTENDED, REPRESENTATION OF IMAGE BASED ON AT LEAST ONE OF DIRECTION IN WHICH DISPLAY AREA OF DISPLAY IS EXTENDED OR SPEED AT WHICH DISPLAY AREA OF DISPLAY IS EXTENDED    404

ELECTRONIC DEVICE FOR ADAPTIVELY CHANGING REPRESENTATION OF IMAGE ACCORDING TO CHANGE IN DISPLAY AREA OF ROLLABLE DISPLAY

CROSS-REFERENCE TO RELATED APPLICATION(S)

This application is a continuation of International Application No. PCT/KR2022/014117 designating the United States, filed on Sep. 21, 2022, in the Korean Intellectual Property Receiving Office and claiming priority to Korean Patent Application No. 10-2022-0010462, filed on Jan. 25, 2022, in the Korean Intellectual Property Office, and to Korean Patent Application No. 10-2021-0179014, filed on Dec. 14, 2021, in the Korean Intellectual Property Office, the disclosures of all of which are incorporated by reference herein in their entireties.

BACKGROUND

Technical Field

The disclosure relates to an electronic device for adaptively changing a representation of an image according to a change in a display area of a rollable display.

Description of Related Art

An electronic device including a rollable display may provide a state in which a part of the rollable display is slid into a housing of the electronic device and a state in which the part of the rollable display is exposed outside the housing. The electronic device may provide a display area having a relatively compact structure, by means of providing those states.

SUMMARY

According to an embodiment, an electronic device may comprise: a housing; a memory configured to store instructions; a display slidable into the housing or slidable out from the housing; and at least one processor, the at least one processor being, when the instructions are executed, configured to: identify, while an image is displayed in a display area of the display exposed outside the housing, an event in which the display area exposed outside the housing is extended; and change, in response to the identification, a representation of the image based on at least one of a direction in which the display area is extended or a speed at which the display area is extended, while the display area is extended.

According to an embodiment, an electronic device may comprise: a housing; a memory configured to store instructions; a display slidable into the housing or slidable out from the housing; and at least one processor, the at least one processor being, when the instructions are executed, configured to: identify, while a first image is displayed in a display area of the display exposed outside the housing, an event in which the display area exposed outside the housing is extended; and change, while the display area is extended, a representation of a second image displayed in response to the identification, based on at least one of a direction in which the display area is extended or a speed at which the display area is extended.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
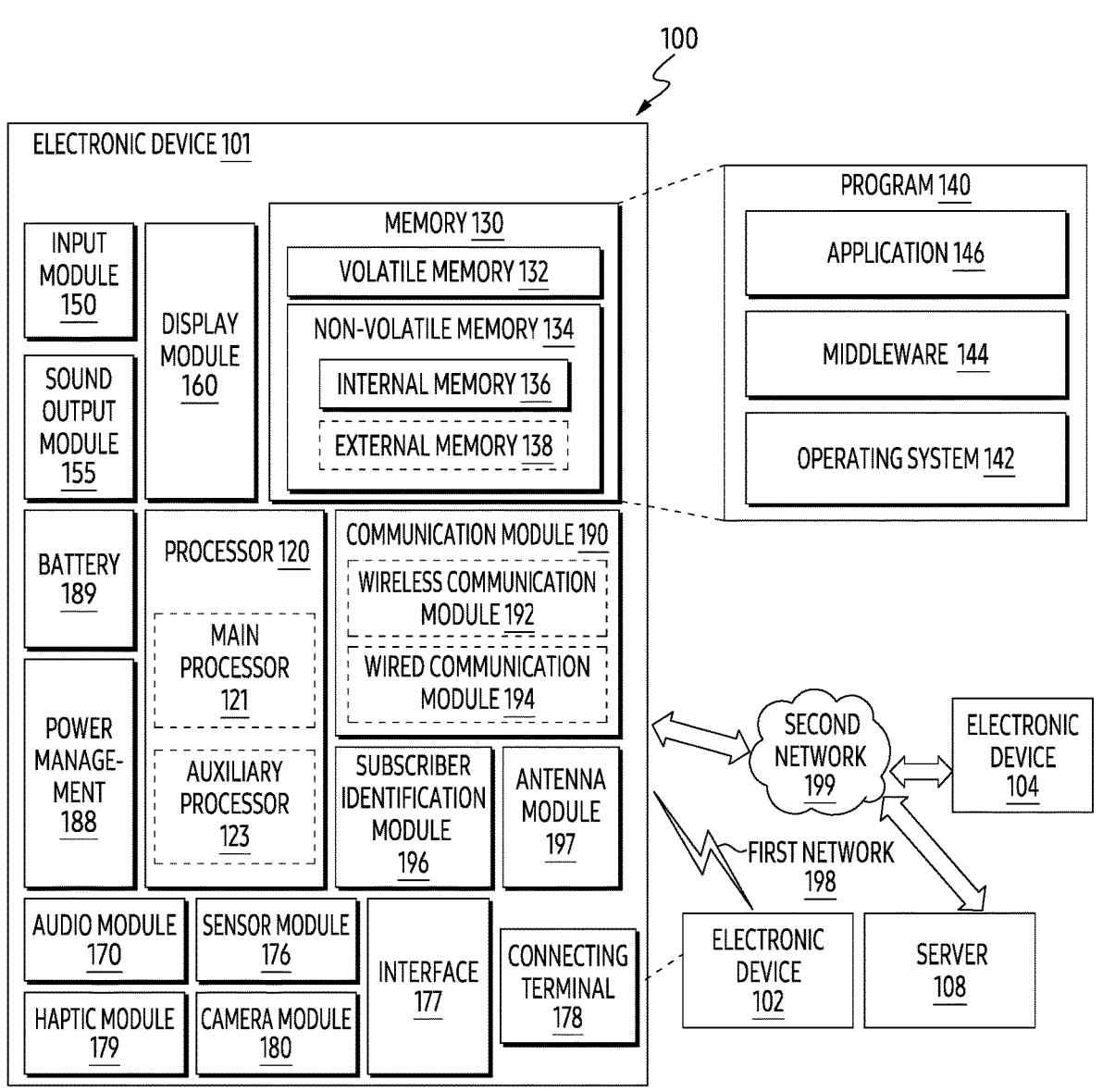
FIG. 1 is a block diagram of an electronic device in a network environment according to various embodiments.

FIG. 1 is a block diagram of an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))).

These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to address, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

In a display of an electronic device that is at least partially rollable, a size of a display area of the display exposed outside its housing may change depending on sliding of the housing. When the electronic device only executes a resizing of the image depending on the change in size of the exposed display area while the housing is sliding, a user may feel that displaying of the image is not smooth to view.

Figure 2:
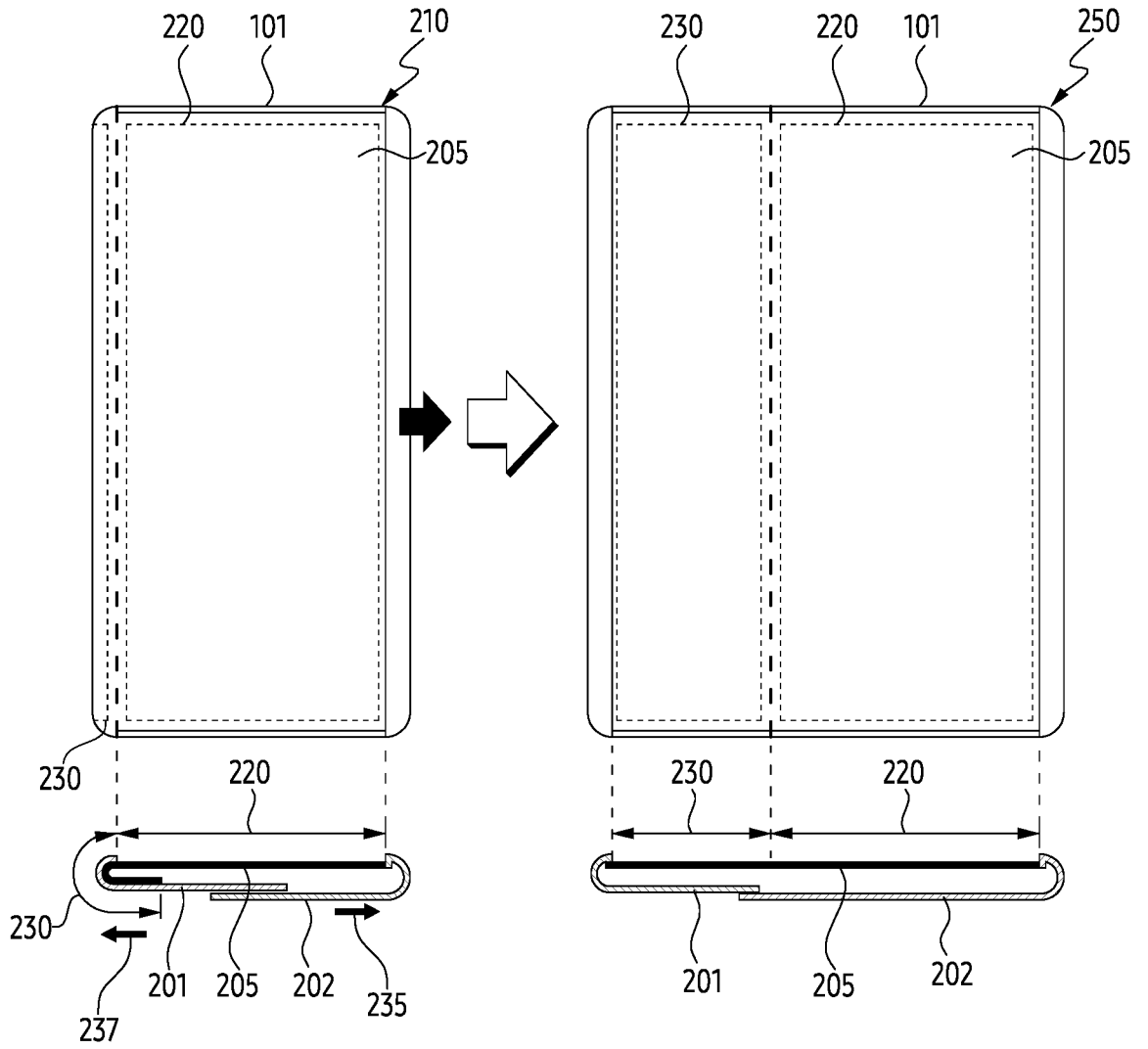
FIG. 2 illustrates exemplary states of a display of an electronic device, according to an embodiment.

FIG. 2 illustrates exemplary states of a display of an electronic device, according to an embodiment.

Referring to FIG. 2, the display 205 (e.g., the display module 160 shown in FIG. 1) of the electronic device 101 may be a rollable display (or a flexible display). For example, since the display 205 may be deformable, the display 205 may have multiple states. For example, the display 205 may be configured to slide into (insertably) or slide out (extractably) from the housing of the electronic device 101.

For example, the display 205 of the electronic device 101 may provide a first state 210 (or a reduced state) as a state of the plurality of states, in which a portion of the display 205 is exposed and another portion of the display 205 is inserted into a first housing 201 of the first housing 201 and a second housing 202. In an embodiment, the first state 210 may be a state in which a viewable area having a minimum size is provided. In an embodiment, the first state 210 may be a state in which the display 205 provides a display area exposed with a minimum size. In the first state 210, the display area exposed with the minimum size may be referred to as a first area 220. In the first state 210, an area of the display 205 that is slid into the first housing 201 may be referred to as a second area 230. In the first state 210, the first area 220 may be a viewable area. In the first state 210, the first area 220 may be an area exposed outside the first housing 201. In the first state 210, the second area 230 may be slidingly inserted into the first housing 201 to be a non-viewable area. In the first state 210, the second area 230 may be slidingly inserted into the first housing 201 with its display area being covered with the first housing 201. For convenience of explanation, this disclosure assumes that the first housing 201 and the second housing 202 are formed of an opaque material, so that when the second area 230 is drawn into the first housing 201, it becomes not viewable. However, it is merely of an example, and at least some parts of the first housing 201 and/or the second housing 202 may be formed of a transparent material so that even when the second area 230 is drawn into the first housing 201, at least a portion of the second area 230 may be viewable through the first housing 201. In this case, the second area 230 may be not viewable when the user views the first area 220 from the front.

The display 205 may provide a second state 250 (or an extended state) in which the display 205 is maximally exposed, as another state of the plurality of states. The second state 250 may be a state in which the display 205 provides a viewable area of a maximum size. The second state 250 may be a state in which the display 205 provides a display area exposed with a maximum size. In the second state 250, the first area 220 and the second area 230 may be viewable areas. In the second state 250, the first area 220 and the second area 230 may be display areas exposed outside the first housing 201.

Although not shown in FIG. 2, the display 205 may provide an intermediate state between the first state 210 and the second state 250. The intermediate state may mean a state in which the first area 220 and a part of the second area 230 are exposed and the remaining part of the second area 230 is drawn into the first housing 201. In the intermediate state, the first area 220 and the part of the second area 230 may be a viewable area. In the intermediate state, the first area 220 and the part of the second area 230 may be display areas exposed outside the first housing 201. In the intermediate state, the remaining part of the second area 230 may be slid into the first housing 201 to be a non-viewable area. In the intermediate state, the remaining part of the second area 230 may be slidingly inserted into the first housing 201 so as to be covered with the first housing 201.

FIG. 2 illustrates an example in which the second housing 202 is moved or slid in a first direction 235 for switching from the first state 210 to the second state 250, but this is merely for convenience of description. For example, depending on the implementation or design of the electronic device 101, the first housing 201 may be moved or slid in a second direction 237 opposite to the first direction 235, for switching from the first state 210 to the second state 250.

Figure 3A:
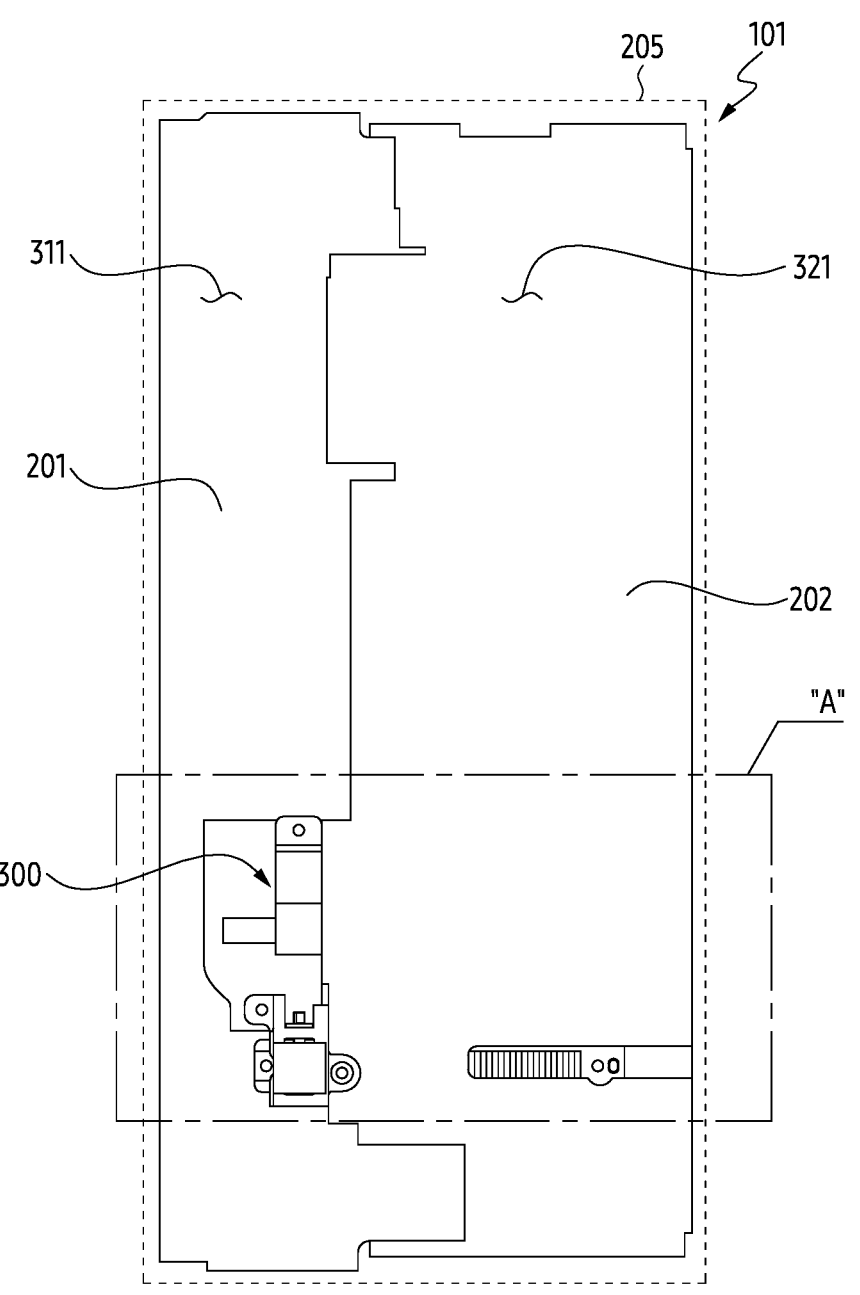
FIG. 3A illustrates an exemplary internal structure of an electronic device with its display removed, according to an embodiment.
Figure 3A:
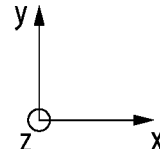

FIG. 3A illustrates an exemplary internal structure of an electronic device with its display removed, according to an embodiment.

Figure 3B:
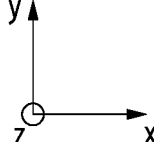
FIG. 3B is an enlarged view of an area A of FIG. 3A, according to one embodiment.

FIG. 3B is an enlarged view of an area A of FIG. 3A, according to one embodiment Referring to FIG. 3A, the electronic device 101 may include a first housing 201, a second housing 202, a display 205, and a power transmission apparatus 300.

In an embodiment, the first housing 201 may include a first surface 311. In an embodiment, the second housing 202 may include a second surface 321 facing a direction corresponding to a direction that the first surface 311 faces. For example, the direction that the first surface 311 faces may be substantially the same as the direction that the second surface 321 faces. In an embodiment, the second housing 202 may be movably or slidably to a portion of the first housing 201 in a first direction (e.g., −x axis direction) or in a second direction (e.g., +x axis direction) opposite to the first direction. In an embodiment, the second housing 202 may be moved or slid either in the first direction or the second direction with respect to the first housing 201.

In an embodiment, the display 205 may be disposed on the first surface 311 of the first housing 201 and the second surface 321 of the second housing 202. For example, a part of the display 205 may be coupled to the second housing 202, and the other part of the display 205 may be exposed to the outside or may be slid into the first housing 201, as the second housing 202 moves. In this disclosure, it is to be noted that a "second surface 321" is merely selected for convenience of description to distinguish it from a "first surface 311", and the "second surface 321" does not imply that the first surface of the second housing 202 not defined in this disclosure is present.

In an embodiment, multiple states may be provided by the second housing 202 that may be moved or slid with respect to the first housing 201. For example, the electronic device 101 may be in a state in which the second housing 202 is no longer moved away from the first housing 201. In some embodiments, the electronic device 101 may be in a state in which the second housing 202 can perform only movement in a first direction amongst the movement in the first direction and the movement in the second direction (see, e.g., FIG. 2). For example, while the electronic device 101 is in one state, the state of the display 205 may be the second state 250 illustrated in FIG. 2. As another example, the electronic device 101 may be in another state in which the second housing 202 is no longer close to the first housing 201. For example, the electronic device 101 may be a state in which the second housing 202 can perform only movement in the second direction amongst the movement in the first direction and the movement in the second direction (see, e.g., FIG. 2). For example, while the electronic device 101 is in the other state, the state of the display 205 may be in the first state 210 illustrated in FIG. 2. As another example, the electronic device 101 may be in a yet another state between the state and the other state. For example, a state of the electronic device 101 may be an intermediate state in which the second housing 202 can perform both the movement in the first direction and the movement in the second direction. For example, the display 205 may be in the intermediate state defined through the description of FIG. 2.

In an embodiment, the second housing 202 may be moved or slid relative to the first housing 201 by means of the power transmission apparatus 300. For example, the second housing 202 may be coupled to a portion of the power transmission apparatus 300 disposed within the first housing 201 for movement in the first direction or movement in the second direction. For example, referring to FIG. 3B, the second surface 321 of the second housing 202 may be coupled to a rack gear 330 extending in the first direction. For example, the rack gear 330 may be engaged with a pinion gear 320. For example, the rack gear 330 engaged with the pinion gear 320 may be moved in the first direction or the second direction, depending on rotation of the pinion gear 320. Movement of the rack gear 330 in the first direction or the second direction by the rotation of the pinion gear 320 may cause the second housing 202 to move either in the first direction or in the second direction with respect to the first housing 201.

In an embodiment, the first housing 201 may support the motor 310. For example, the motor 310 supported by the first housing 201 may rotate the pinion gear 320 via a shaft coupled to the pinion gear 320. For example, the motor 310 may be implemented as a step-motor to further secure a mounting space for the electronic device 101. However, the disclosure is not limited thereto.

FIGS. 3A and 3B illustrate an example of moving or sliding the second housing 202 by means of the motor 310, the pinion gear 320, and the rack gear 330 with respect to the first housing 201, but this is only for convenience of description. For example, to move the second housing 202 with respect to the first housing 201, the electronic device 101 may include another power transmission apparatus distinguished from the power transmission apparatus 300 including the motor 310, the pinion gear 320, and the rack gear 330.

Figure 3C:
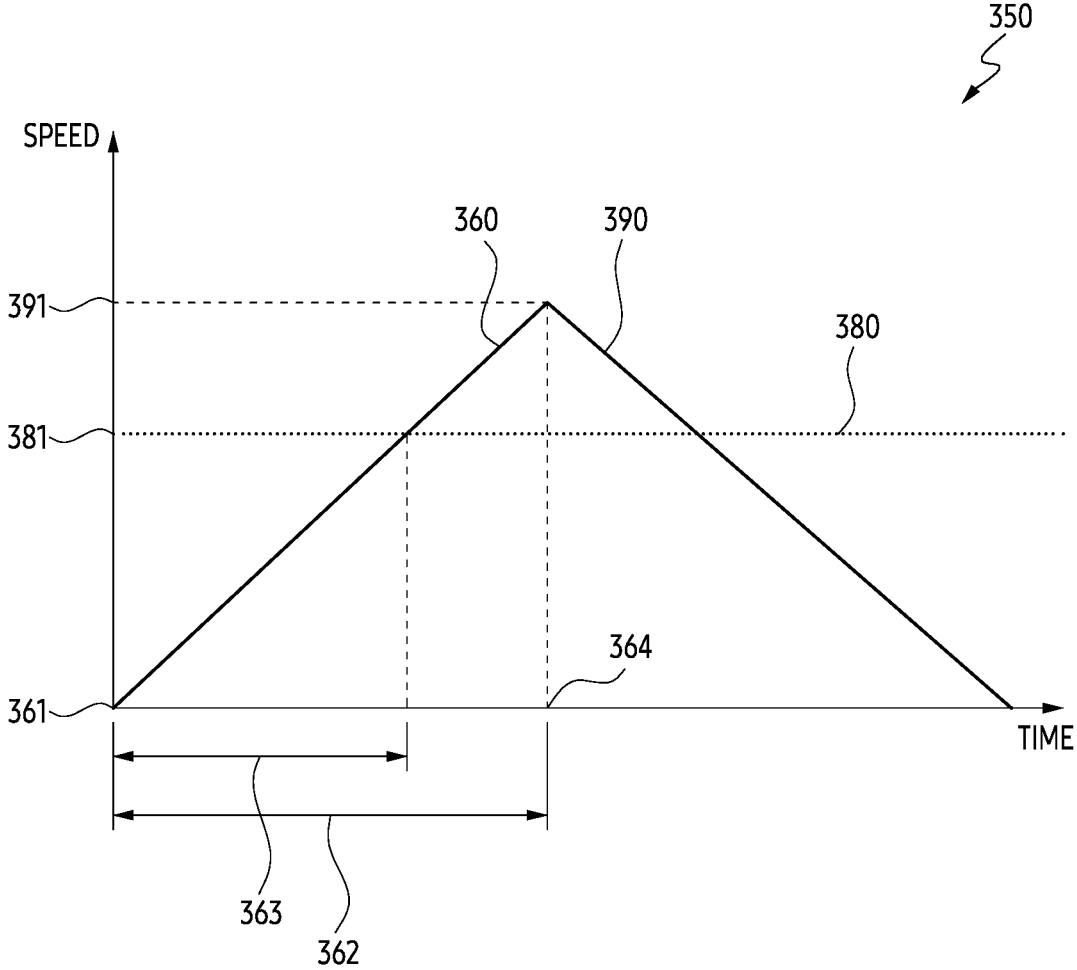
FIG. 3C is a graph illustrating an exemplary speed at which a display area of a display of an electronic device is extended, according to an embodiment.

FIG. 3C is a graph illustrating an exemplary speed at which a display area of a display of an electronic device is extended, according to an embodiment. As shown in FIG. 3C, a graph 350 represents a speed at which the display area of the display 205 of the electronic device 101 is extended. A horizontal axis of the graph 350 indicates time, and a vertical axis of the graph 350 indicates speed.

As in a first line 360 of the graph 350, the speed at which the display area of the display 205 is extended may gradually increase for a first time duration 362 from a first timing 361 at which the extension of the display area of the display 205 begins. In some embodiments, a processor 120 of the electronic device 101 may, in response to identifying a user input to extend the display area of the display 205, control a means for extending the display area of the display 205 (e.g., the power transmission apparatus 300 shown in FIGS. 3A and 3B), so that the speed gradually increases as in the first line 360.

For example, when the display area of the display 205 is extended at a fixed speed 381 like a second line 380 from the first timing 361 when the extension of the display area of the display 205 starts, there might be a high possibility for the electronic device 101 to be separated from the user, and thus, the processor 120 may control the means for extending the display area of the display 205 so that the speed at which the display area of the display 205 is extended gradually increases during the first time duration 362 from the first timing 361. For example, since for a second time duration 363 from the first timing 361, the speed at which the display area of the display 205 is extended is less than or equal to a certain speed 381, it is possible to prevent the electronic device 101 gripped by the user from being separated from the user.

Meanwhile, the speed at which the display area of the display 205 is extended may gradually decrease as shown in a third line 390 of the graph 350.

In an embodiment, the processor 120 may, based on identifying that a distance by which the display area of the display 205 is to be extended remains by a predetermined distance, control the means for extending the display area of the display 205 so that the speed at which the display area of the display 205 is extended gradually decreases. For example, the processor 120 may identify a target distance indicated by the user input, identify a second timing 364 that initiates decreasing the speed at which the display area of 205 is extended, based on comparing the target distance with a distance by which the display area of the display 205 is extended, and decrease the speed at which the display area of the display 205 is extended based on identifying the second timing 364. For example, since the speed at which the display area of the display 205 is extended gradually decreases before a preset time from the timing at which the extension of the display area of the display 205 is completed, the user of the electronic device 101 may intuitively recognize that the extension of the display area of the display 205 is completed. For example, since the speed at which the display area of the display 205 is extended gradually decreases before the preset time from the timing at which the extension of the display area of the display 205 is completed, the electronic device 101 may provide soft braking when the extension of the display area of the display 205 is complete. However, the disclosure is not limited thereto.

In an embodiment, when the display area of the display 205 is extended based on an external force pulling the housing (e.g., the first housing 201 or the second housing 202) of the electronic device 101, the processor 120 may estimate a timing at which the extension of the display area of the display 205 is to be completed based on identifying through the sensor module 176 that the external force decreases, and may gradually decrease the speed of the extension of the display area of the display 205 based on the estimated timing. For example, since the speed of the extension of the display area of the display 205 gradually decreases based on estimating the user's intention, the electronic device 101 may provide smooth braking upon completion of the extension of the display area of the display 205. However, the disclosure is not limited thereto.

Figure 4:
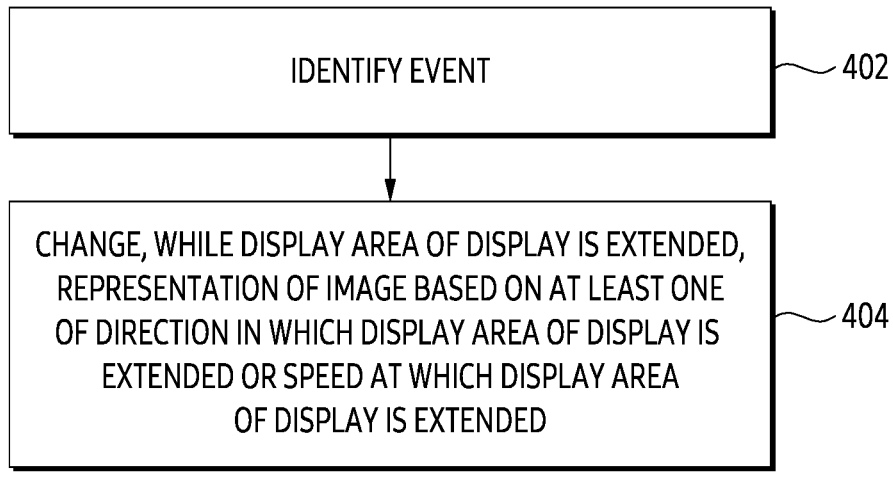
FIG. 4 is a flowchart illustrating a method of displaying an image based on extension of a display area of a display, according to an embodiment.

FIG. 4 is a flowchart illustrating a method of displaying an image based on an extension of a display area of a display, according to an embodiment. This method may be executed by the electronic device 101 shown in FIG. 1, the electronic device 101 shown in FIG. 2, the electronic device 101 shown in FIGS. 3A and 3B, or by the processor 120 of the electronic device 101 shown in FIG. 1.

Figure 5:
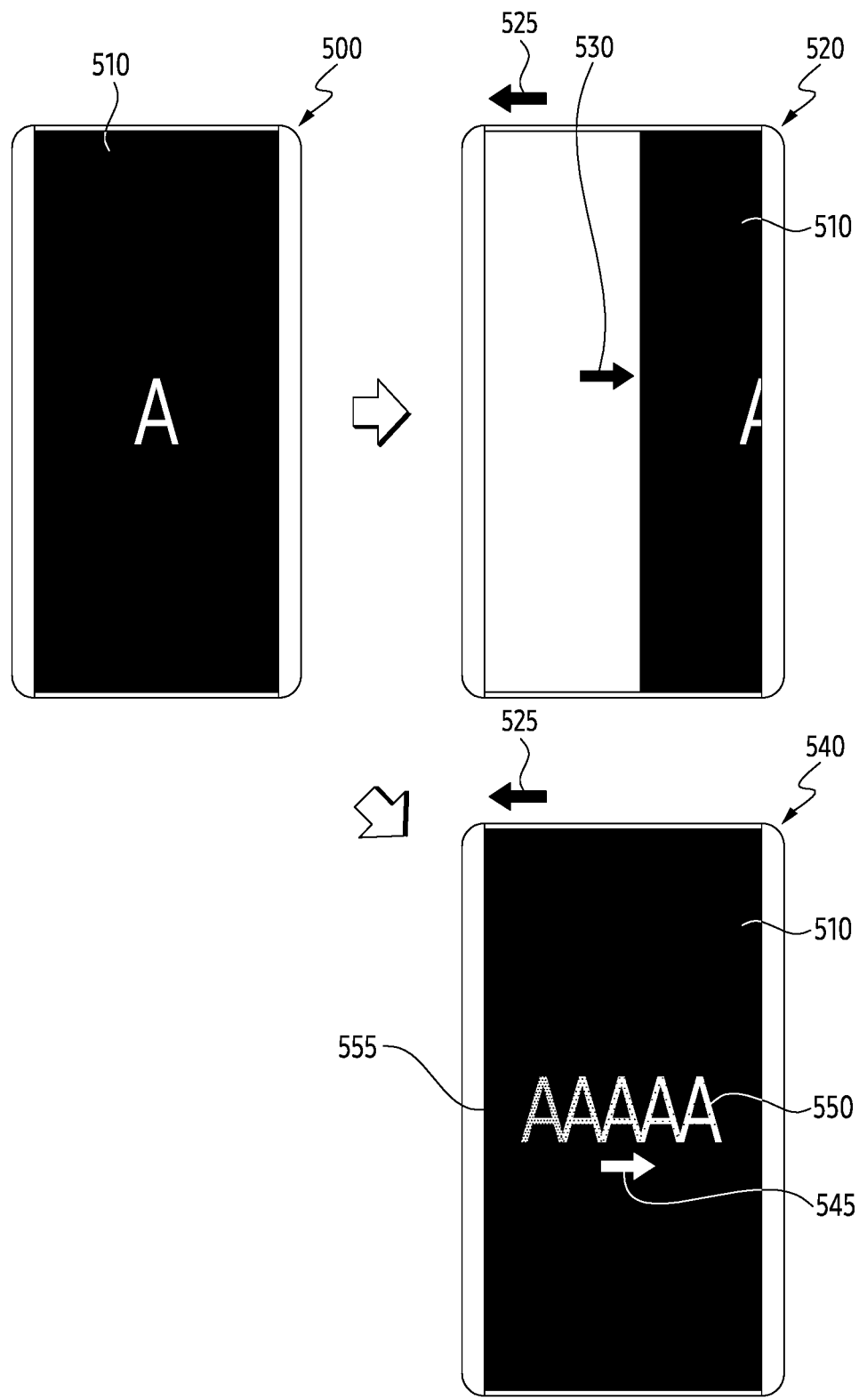
FIG. 5 illustrates an exemplary image moved based on extension of a display area of a display, according to an embodiment.

FIG. 5 illustrates an exemplary image that is moved based on extension of a display area of a display, according to one embodiment.

Figure 6:
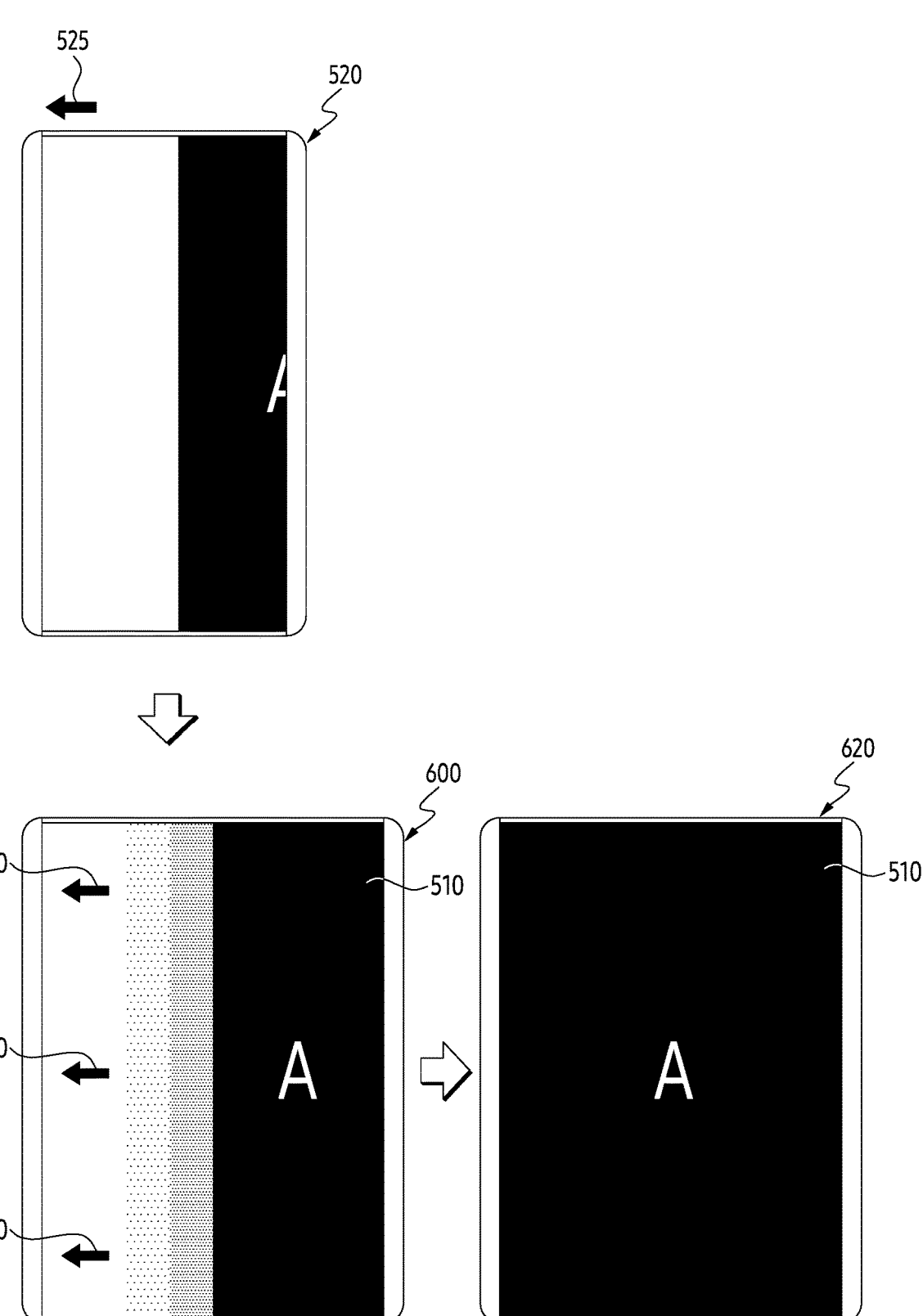
FIG. 6 shows an exemplary image displayed after completion of extension of a display area of a display, according to one embodiment.

FIG. 6 illustrates an exemplary image displayed after completing of extension of a display area of a display, according to one embodiment.

Figure 7:
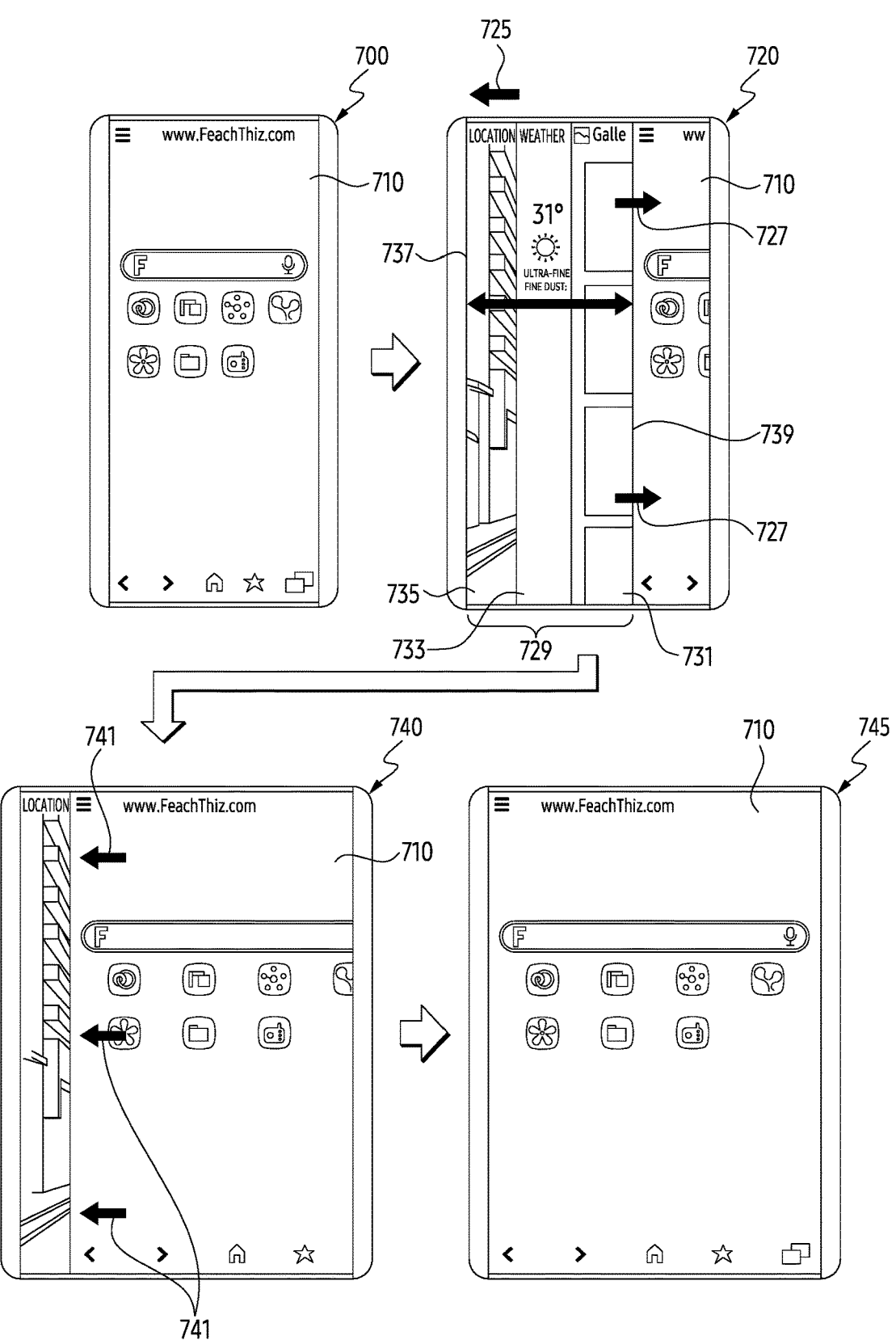
FIG. 7 illustrates exemplary additional information displayed along with an image including a user interface of a software application being executed in a foreground state, according to an embodiment.

FIG. 7 illustrates exemplary additional information displayed along with an image including a user interface of a software application that is executed in a foreground state, according to an embodiment.

Figure 8:
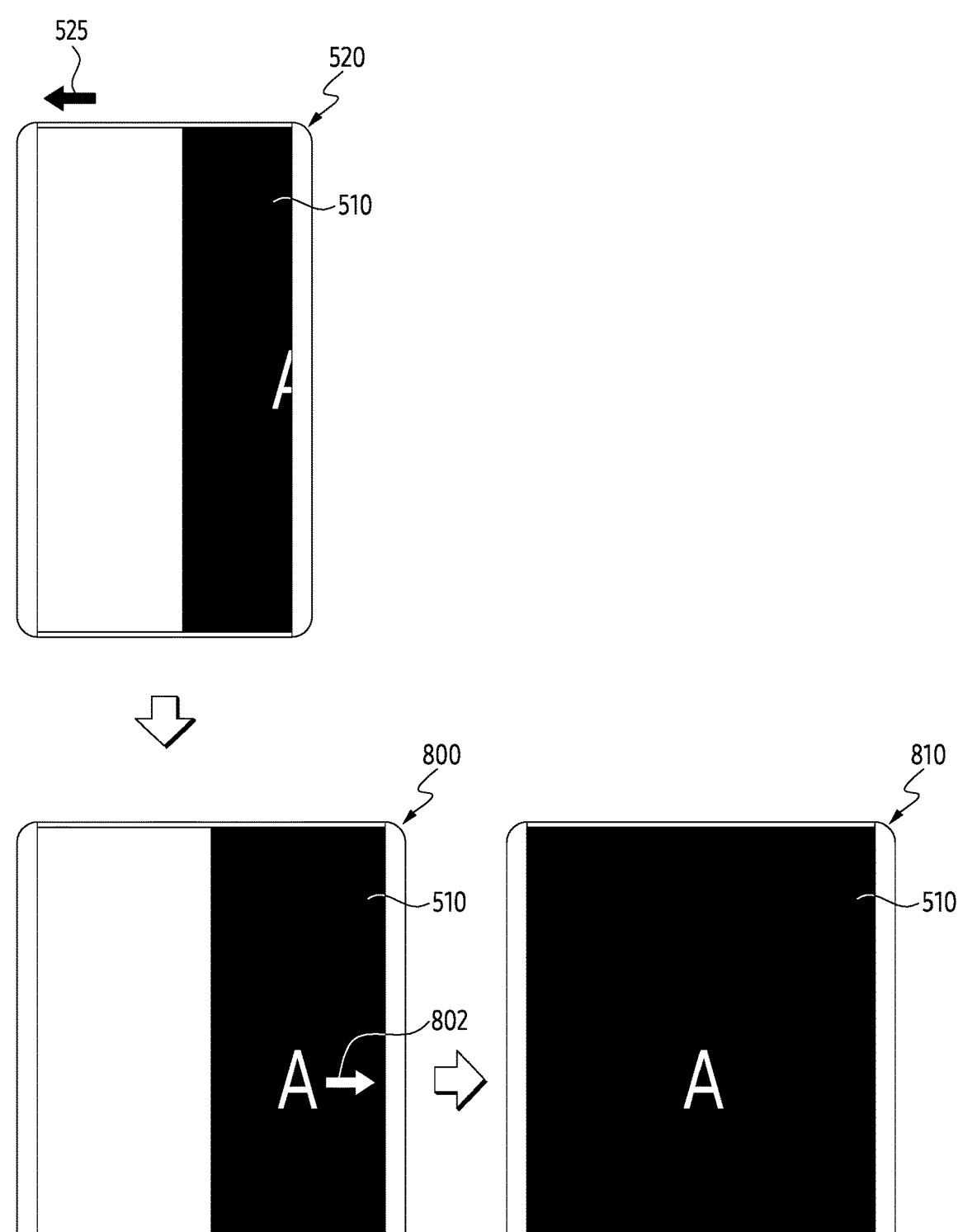
FIG. 8 illustrates an exemplary image extended after being moved by a preset distance based on extension of a display area of a display, according to an embodiment.

FIG. 8 illustrates an exemplary image extended after being moved by a preset distance based on extension of a display area of a display, according to an embodiment.

FIGS. 9 to 12 illustrate exemplary additional information displayed along with an image including a user interface of a software application, according to an embodiment.

Figure 13:
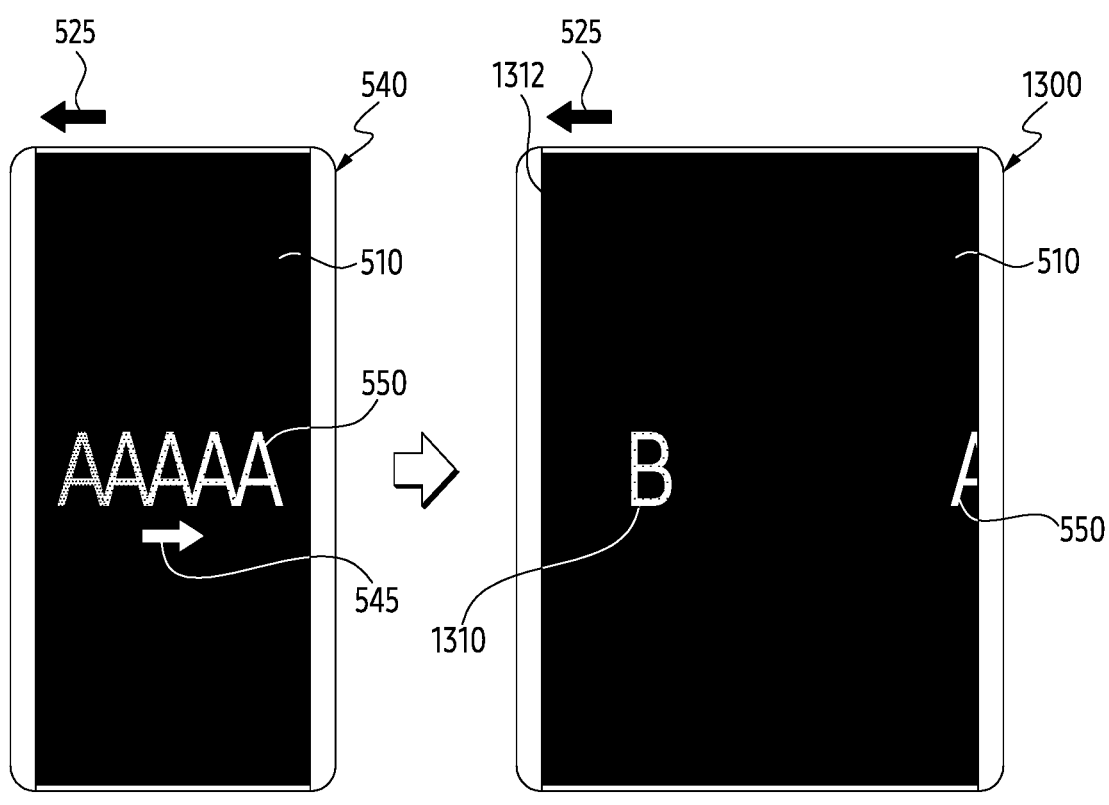
FIG. 13 illustrates an exemplary visual object in an image moved based on extension of a display area of a display, according to one embodiment.

FIG. 13 illustrates an exemplary visual object in an image moved based on extension of a display area of a display, according to one embodiment.

Figure 14:
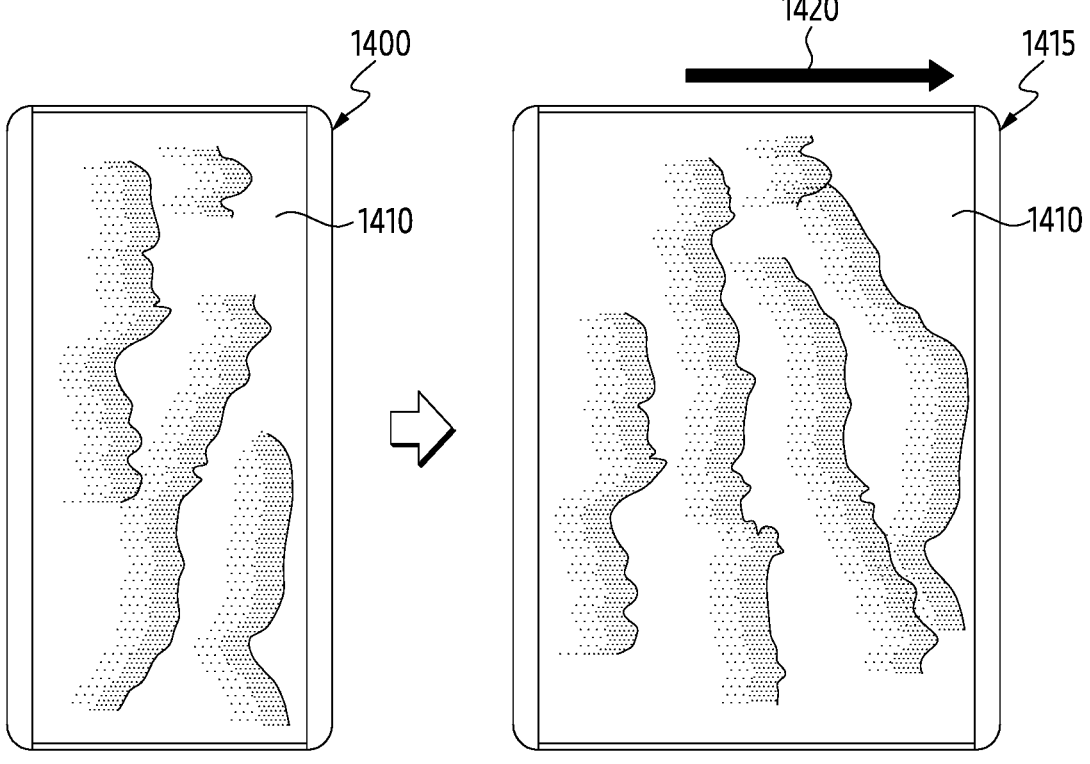
FIGS. 14 and 15 illustrate an example animation of moving a visual object based on extension of a display area of a display, according to one embodiment.
Figure 15:
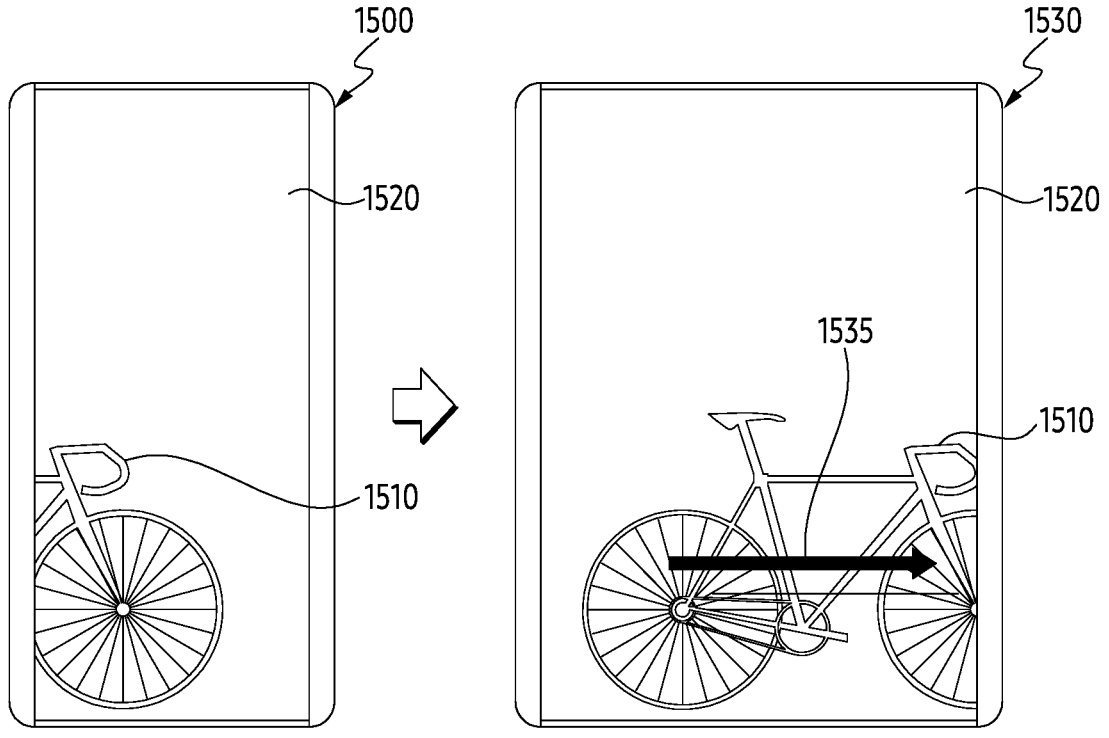

FIGS. 14 and 15 illustrate an exemplary animation of moving a visual object based on extension of a display area of a display, according to one embodiment.

Figure 16:
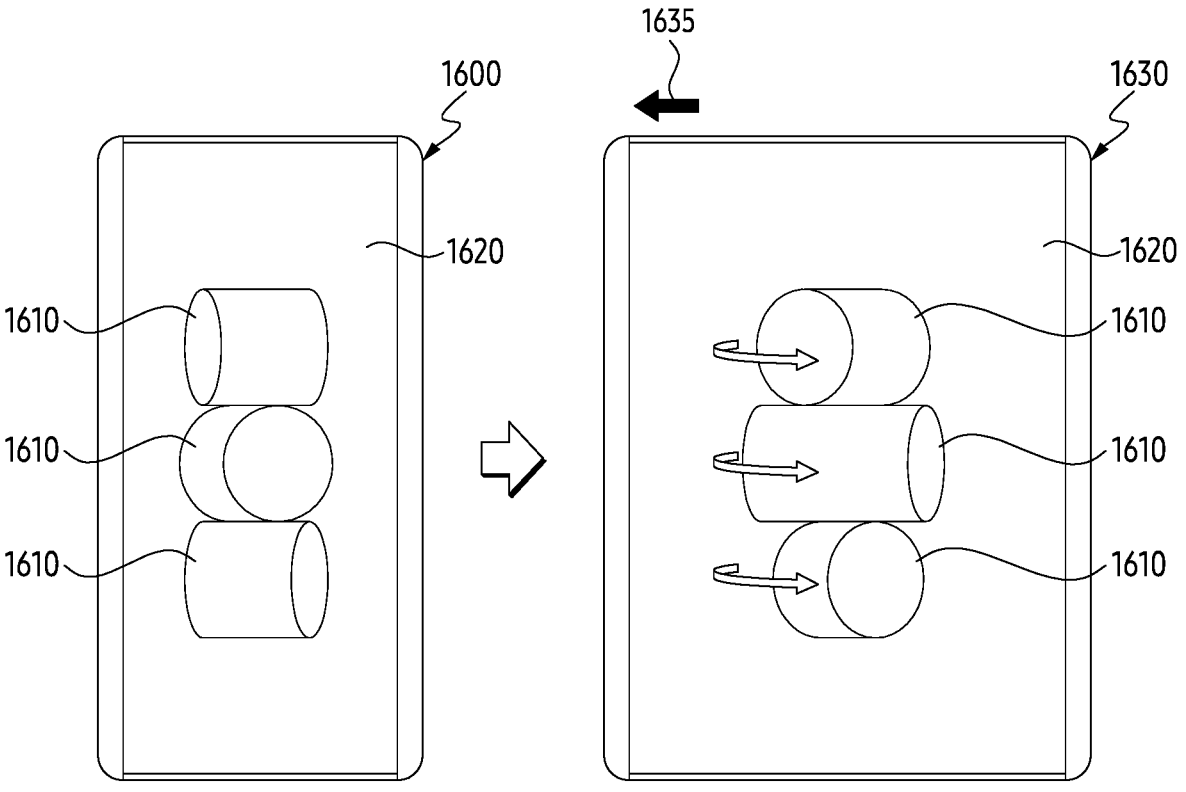
FIG. 16 shows an exemplary visual object in an image, represented in 3D, rotated based on extension of a display area of a display, according to one embodiment.

FIG. 16 illustrates an exemplary visual object in an image, represented in 3D, rotated based on extension of a display area of a display, according to one embodiment.

Figure 17:
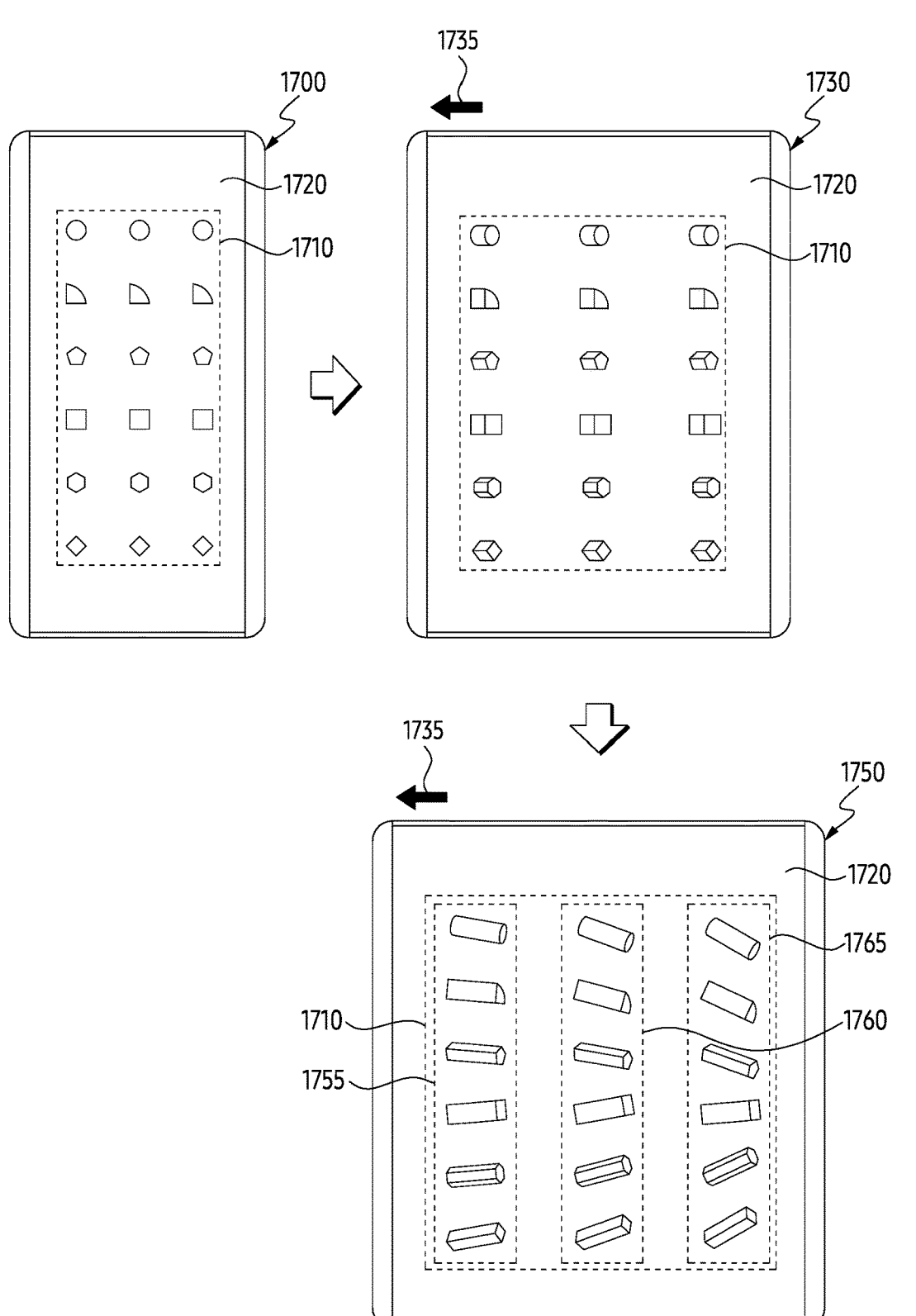
FIG. 17 illustrates an exemplary visual object of which representation is switched from a two-dimensional (2D) shape to a three-dimensional (3D) shape based on extension of a display area of a display, according to one embodiment.

FIG. 17 illustrates an exemplary visual object of which representation is switched from two-dimensional (2D) shape to three-dimensional (3D) shape based on extension of a display area of a display, according to one embodiment.

Referring now to FIG. 4, in operation 402, the processor 120 may identify an event in which the display area exposed outside the housing is extended or contracted (e.g., by sliding extractably from the housing or sliding insertably into the housing, respectively), while an image is displayed within the display area of the display 205 exposed outside the housing (e.g., the first housing 201 shown in FIG. 2). The following description exemplifies operations when the display area is extended, but this is only for convenience of description. In some embodiments, the event may include changing a size (either increasing or decreasing) of the display area of the display 205. In an embodiment, the processor 120 may identify the event in which the display area is enlarged or reduced in operation 402. For example, the event can include an operation of changing the size of the display area of the display 205, and may include rotation of a housing (e.g., a sliding event of the second housing 202), rotation of a motor (e.g., the motor 310 of FIG. 3) and/or rotation of a pinion gear (e.g., the pinion gear 320 of FIG. 3). However, the disclosure is not limited thereto.

In an embodiment, the image may be a user interface of a software application installed in the electronic device 101. In an embodiment, the image may be a wallpaper. For example, the wallpaper may include an executable object for executing a software application installed in the electronic device 101. For example, the wallpaper may include a background image positioned beneath the executable object. In an embodiment, the image may be a lock screen displayed while the electronic device 101 is in a locked state. For example, the locked state may refer to a state of limiting execution of the remaining functions except for at least one function provided without the user's authentication among a plurality of functions that may be provided via the electronic device 101. For example, the lock screen may include at least one visual object, local time information, battery state information, and reception strength information of a signal received from an external electronic device (e.g., the electronic device 102) via the communication module 190, and/or at least one executable object for executing the at least one function. For example, the lock screen may include a background image. In an embodiment, the image may be a screen displayed while the electronic device 101 is in an always-on-display (AOD) mode. For example, the AOD mode may refer to a mode to display the screen using a display driving circuit in the display or a display driving circuit operatively coupled with the display 205, during at least a portion of a time period in which the processor 120 is in a lower power state or a sleep state. For example, the screen displayed in the AOD mode may include at least one visual object, local time information, battery state information, and/or notification information indicating an event caused in the electronic device 101. In an embodiment, the image is not limited to the above-described examples. For example, the image may be frame data generated by a processor (e.g., the processor 120 of FIG. 1) based on a frame rate of the display 205. For example, the frame data may include a wallpaper, an execution screen of an application, and/or a screen inclusive of a notification bar.

In an embodiment, the extension (or contraction) of the display area of the display 205 may be caused by a predefined user input. For example, in response to a user input to a physical button exposed through a portion of a housing (e.g., the first housing 201 or the second housing 202) of electronic device 101, the processor 120 may control a power transmission apparatus (e.g., the power transmission apparatus 300) of the electronic device 101 to extend (or contract) the display area of the display 205. For another example, in response to a touch input to an executable object, displayed on display 205, for extending the display 205, the processor 120 may control the power transmission apparatus of the electronic device 101 to extend the display area of display 205. As another example, the display area of the display 205 may be extended by a user input including physically pulling or pushing the housing coupled with the display 205 (e.g., the second housing 202 shown in FIG. 2). As another example, the processor 120 may, based on a user input identified in an external electronic device (e.g., earbuds or a smart watch) connected to the electronic device 101, control the power transmission apparatus of the electronic device 101 to extend the display area. For example, the external electronic device connected to the electronic device 101 may transmit information on the user input to the electronic device 101 in response to the user input received from the external electronic device. The processor 120 may receive the information from the external electronic device via a communication circuit of the electronic device 101 (e.g., the communication module 190 shown in FIG. 1), and based on the received information, control the power transmission apparatus of the electronic device 101 to cause the display area of the display 205 to be extended.

In an embodiment, the extension of the display area of the display 205 may be identified using a sensor (e.g., the sensor module 176 shown in FIG. 1). For example, when the electronic device 101 includes the power transmission apparatus 300 shown in FIGS. 3A and 3B, the electronic device 101 may include a Hall sensor (also referred to as a Hall effect sensor) disposed on the second surface opposite to the first surface including teeth of the pinion gear 320 engaged with teeth of the pinion gear 320, and at least one magnet disposed on the surface opposite to the second surface 321 of the second housing 202 of the electronic device 101. The processor 120 may obtain data on the magnetic field from the at least one magnet, which varies depending on movement of the at least one magnet through the Hall sensor, and based on the obtained data, identify the extension of the display area of the display 205. As another example, when the electronic device 101 includes the power transmission apparatus 300 shown in FIGS. 3A and 3B, the electronic device 101 may include at least one magnet disposed on a shaft or within the shaft connecting the pinion gear 320 and the motor 310, and a Hall sensor spaced apart from the pinion gear 320. The processor 120 may obtain data on the magnetic field from the at least one magnet, which varies depending on movement of the at least one magnet through the Hall sensor, and based on the obtained data, identify the extension of the display area of the display 205.

As another example, when the electronic device 101 includes a sensor configured to identify an external force pulling (or pushing) the housing (e.g., the first housing 201 or the second housing 202) of the electronic device 101, the processor 120 may identify the extension (or contraction) of the display area of the display 205 based on the data on the external force obtained through the sensor.

In an embodiment, the extension of the display area of the display 205 may be identified based on an electrical signal provided to the processor 120 according to a user input to a physical button exposed through a portion of the housing (e.g., the first housing 201 or the second housing 202) of the electronic device 101.

In an embodiment, the extension of the display area of the display 205 may be identified based on a user input to the executable object, displayed on the display 205, for extending the display area of the display 205.

In an embodiment, the extension of the display area of the display 205 may be identified based on information about a user input received from the external electronic device connected to the electronic device 101.

In operation 404, in response to the identification, the processor 120 may change, while the display area of the display 205 is extended, representation of the image based on at least one of a direction in which the display area of the display 205 is extended or a speed at which the display area of the display 205 is extended.

In an embodiment, when the electronic device 101 includes the power transmission apparatus 300 shown in FIGS. 3A and 3B, the direction in which the display area of the display 205 is extended may be identified based on a direction of rotation of the pinion gear 320 provided by the motor 310, or may be identified based on a signal provided to the motor 310 to control the rotation of the pinion gear 320. For example, the processor 120 may identify the direction in which the display area of the display 205 is extended based on identifying whether the direction of rotation of the pinion gear 320 provided by the motor 310 is clockwise or counterclockwise.

In an embodiment, the direction in which the display area of the display 205 is extended may be identified based on a user input that causes the extension of the display area of the display 205. For example, when the user input is a user input to a physical button exposed through a portion of the housing (e.g., the first housing 201 or the second housing 202) of the electronic device 101, the processor 120 may identify the direction in which the display area of the display 205 is extended, based on identifying which physical button the physical button pressed by the user input is. As another example, when the user input is a user input for pulling or pushing the housing coupled with the display 205 (e.g., the first housing 201 or the second housing 202), the processor 120 may identify the direction in which the display area of the display 205 is extended, based on the direction of an external force caused by the user input. As another example, when the user input is a touch input to an executable object displayed through the display 205, the processor 120 may identify the direction in which the display area is extended, based on the direction indicated by the touch input. As another example, when the user input is a user input identified by the external electronic device, the processor 120 may identify the direction in which the display area of the display 205 is extended, based on information about the user input received from the external electronic device.

In an embodiment, the direction in which the display area of the display 205 is extended may be identified based on identifying the event in operation 402. In an embodiment, the direction in which the display area of the display 205 is extended may be identified while executing operation 404 after execution of operation 402.

In an embodiment, when the electronic device 101 includes the power transmission apparatus 300 shown in FIGS. 3A and 3B, the speed at which the display area of the display 205 is extended may be identified based on the speed of rotation of the pinion gear 320 provided by the motor 310 or identified based on a signal provided to the motor 310 to control the speed of rotation of the pinion gear 320.

In an embodiment, the speed at which the display area of the display 205 is extended may be a predetermined speed. For example, the speed at which the display area of the display 205 is extended may gradually increase as in the first line 360 of the graph 350 shown in FIG. 3C or may gradually decrease as in the third line 390 of the graph 350 shown in FIG. 3C.

In an embodiment, the speed at which the display area of the display 205 is extended may be identified based on a user input. For example, when the user input is a user input for pulling or pushing the housing coupled with the display 205 (e.g., the first housing 201 or the second housing 202), the processor 120 may identify the speed at which the display area of the display 205 is extended, based on a magnitude of the external force caused by the input. As another example, when the user input is a touch input to an executable object displayed through the display 205, the processor 120 may identify the speed at which the display area of the display 205 is extended, by identifying the speed indicated by the touch input. As another example, when the user input is a user input identified by an external electronic device, the processor 120 may identify the speed at which the display area of the display 205 is extended, based on information about the user input received from the external electronic device.

In an embodiment, changing the representation of the image may include moving the image. In an embodiment, changing the representation of the image may include changing a size of the image. For example, the size of the image may be enlarged based on the size of the display area that is extended according to the extension of the display area of the display 205. In an embodiment, changing the representation of the image may include rotating at least a portion of the image. In an embodiment, changing the representation of the image may include changing at least part of a color of the image. In an embodiment, changing the representation of the image may include changing brightness of at least a portion of the image. In an embodiment, changing the representation of the image may include applying a visual effect to at least a portion of the image. In an embodiment, changing the representation of the image may include moving at least one visual object of a plurality of visual objects within the image. In an embodiment, changing the representation of the image may include changing a shape of a visual object within the image. For example, the shape of the visual object may be changed from a two-dimensional (2D) shape to a three-dimensional (3D) shape according to the extension of the display area of the display 205. In an embodiment, changing the representation of the image may include rotating a visual object within the image. For example, the visual object may rotate in a direction (e.g., clockwise or counterclockwise direction) corresponding to the direction in which the display area of the display 205 is extended. In an embodiment, changing the representation of the image may include changing at least part of the color of a visual object in the image. In an embodiment, changing the representation of the image may include changing the brightness of at least a portion of a visual object in the image. In an embodiment, changing the representation of the image may include applying a visual effect to at least a portion of a visual object in the image.

For example, FIG. 5, the processor 120 may display an image 510 in a first state 500. The processor 120 may identify an extension of the display area of the display (e.g., the display 205 of FIG. 2) while the image 510 is displayed in the first state 500. For example, in the first state 500, the electronic device 101 may be in the first state 210. However, the disclosure is not limited thereto.

In an embodiment, the processor 120, in response to the identification of the extension of the display area of the display 205, may change the first state 500 to the second state 520 while the display area of the display 205 is extended. In some embodiments, in the second state 520, the electronic device 101 may be in the intermediate state defined through the description of FIG. 2. In some embodiments, in the second state 520, the processor 120 may change the representation of the image 510, while the display area of the display 205 is extended, based on a first direction 525 in which the display area of the display 205 is extended. For example, in the second state 520, the processor 120 may change the representation of the image 510 as displaying the image 510 moved in a second direction 530 identified based on the first direction 525. In some embodiments, the second direction 530 can be an opposite direction of the first direction 525.

In some embodiments, since the image 510 in the second state 520 is moved in the second direction 530, the processor 120 may display a portion of the image 510 in the second state 520 through the display 205. Meanwhile, in the second state 520, the processor 120 may cease displaying the remaining part of the image 510 through the display 205. For example, since the image 510 is moved in the second direction 530 while the display area of the display 205 is extended, the remaining part of the image 510 may disappear in the second state 520, as opposed to the portion of the image 510 displayed through the display 205.

Meanwhile, in an embodiment, the speed at which the image 510 is moved may change depending upon the speed at which the display area of the display 205 is extended (or contracted). For example, when the speed at which the display area of the display 205 is extended changes as shown in FIG. 3C, the speed at which the image 510 is moved may change depending on the speed at which the display area of the display 205 is extended. The speed at which the image 510 is moved may change linearly or nonlinearly with respect to the speed at which the display area of the display 205 is extended or contracted.

In an embodiment, the processor 120, in response to the identification of the extension of the display area of the display 205, may change the first state 500 to a third state 540 while the display area of the display 205 is extended. For example, in the third state 540, the electronic device 101 may be in the intermediate state defined through the description of FIG. 2. For example, in the third state 540, the processor 120 may change the representation of the image 510, while the display area of the display 205 is extended, based on the first direction 525 in which the display area of the display 205 is extended. For example, in the third state 540, the processor 120 may change the representation of image 510 as displaying the image 510 including the visual object 550, which has been moved in a third direction 545 identified based on the first direction 525. In some embodiments, the third direction 545 may correspond to the second direction 530. However, the present disclosure is not limited thereto. In an embodiment, the visual object 550 within the image 510 in the third state 540 may be moved in a third direction 545, as opposed to at least one other visual object in the image 510 (not shown in FIG. 5).

In some embodiments, all visual objects within the image 510 in the second state 520 may be moved along the extension of the display area of the display 205, while the at least one other visual object within the image 510 in the third state 540 may be fixed independently of the extension of the display area of the display 205 and have a movement independent of the extension of the display area of the display 205. In an embodiment, a distance that the visual object 550 within the image 510 is moved in the third direction 545 in the third state 540 may be determined based on a distance in which the display area of the display 205 is extended in the first direction 525. For example, displaying of the visual object 550 in the image 510 may be ceased by the movement of the visual object 550 in the third direction 545 according to the position of the visual object 550 in the first state 500 and the distance in which the display area of the display 205 is extended in the first direction 525. However, the present disclosure is not limited thereto.

Meanwhile, although not shown in FIG. 5, in the third state 540, the processor 120 may newly display another visual object that was not displayed in the first state 500. For example, the other visual object may appear from a periphery 555 of the display area of the display 205 exposed by the extension of the display area of the display 205, and then, the other visual object may move in the third direction 545. In an embodiment, the other visual object may include a part extending from at least a portion of the visual object. For example, the visual object and the other visual object may form one shape. In an embodiment, the speed at which the visual object 550 within the image 510 in the third state 540 is moved in the third direction 545 may change depending on the speed at which the display area of the display 205 is extended.

Referring again to FIG. 4, the processor 120 may identify completion of the extension of the display area of the display 205 while performing operation 404.

In an embodiment, the completion of the extension of the display area of the display 205 may be identified based on a release of a user input that caused the extension of the display area of the display 205. For example, when the user input is a user input for a physical button exposed through a portion of the housing (e.g., the first housing 201 or the second housing 202) of the electronic device 101, the processor 120 may identify the completion of the extension of the display area of the display 205 based on detecting a release of depressing of the physical button. As another example, when the user input is a user input for pulling or pushing the housing coupled to the display 205 of the electronic device 101, the processor 120 may identify the completion of the extension of the display area of the display 205, based on a release of an external force caused by the user input. As another example, when the user input is a touch input for an executable object displayed via the display 205, the processor 120 may identify the completion of the extension of the display area of the display 205 based on a change in capacitance caused in a position indicating the executable object. As another example, when the user input is a user input identified by the external electronic device, the processor 120 may, based on identifying that information for the user input is not received from the external electronic device for a predetermined time duration, identify the completion of the extension of the display area of the display 205.

In an embodiment, the completion of the extension of the display area of the display 205 may be identified based on identifying that the display 205 has reached a target distance identified based on the user input.

In an embodiment, when the electronic device 101 includes the power transmission apparatus 300 shown in FIGS. 3A and 3B, the completion of the extension of the display area of display 205 may be identified based on ceasing of rotation of the pinion gear 320 by the motor 310 in the power transmission apparatus 300 or a signal provided to the motor 310 in the power transmission apparatus 300 to cease the rotation of the pinion gear 320.

In an embodiment, the processor 120 may provide a visual effect to indicate the completion of the extension of the display area of display 205, on condition of identifying the completion of the extension of the display area of the display 205. For example, FIG. 6, the processor 120 may switch the second state 520 to a fourth state 600 based on identifying the completion of the extension of the display area of the display 205. For example, in the fourth state 600, the electronic device 101 may be in the second state 250. However, the present disclosure is not limited thereto. In some embodiments, in the fourth state 600, the processor 120 may provide a bounce back effect to move the image 510 in a direction the image 510 has been moved or in a fourth direction 610 corresponding to the first direction 525 the display area of the display 205 is extended. For example, in the fourth state 600, visual objects in the image 510 may be moved in the fourth direction 610. For example, in the fourth state 600, the image 510 including visual objects moving in the fourth direction 610 may be extended in the fourth direction 610. For example, after completion of the movement of the visual objects in the fourth direction 610, the processor 120 may change the fourth state 600 to a fifth state 620. In the fifth state 620, the processor 120 may display the image 510 having an enlarged size in the display area of the display 205 having the enlarged size.

For example, FIG. 7, the processor 120 may display a user interface 710 of a first software application installed in the electronic device 101 in a first state 700. For example, in the first state 700, the electronic device 101 may be in the first state 210. However, the disclosure is not limited thereto. The processor 120 may change the first state 700 to a second state 720 in response to identifying the extension of the display area of the display 205 in the first state 700. For example, in the second state 720, the electronic device 101 may be in the intermediate state defined through the description of FIG. 2. For example, in the second state 720, the processor 120 may display, while the display area of the display 205 is extended in the first direction 725, the user interface 710 moved in the second direction 727 identified based on the first direction 725. For example, the processor 120 may, based on the movement of the user interface 710 in the second direction 727, display a portion of the user interface 710 and stop displaying the remaining portion of the user interface 710.

In the meantime, in the second state 720, the processor 120 may display information on user interfaces of software applications that have been executed in the foreground state before the first software application is executed in the foreground state, in a portion 729 of the display area including a first space formed according to the movement of the user interface 710 in the second direction 727 and a second space newly exposed according to the extension of the display area in the first direction 725. For example, executing the software application (e.g., the first software application) in the foreground state may mean executing the software application in a state of displaying the user interface (e.g., the user interface 710) of the software application via the display 205. For example, executing the software application in the foreground state may mean executing the software application in a state capable of receiving a user input related to the software application.

In an embodiment, the information may include a portion of each of the user interfaces of the software applications. The information displayed in the second state 720 may include a portion of the user interface 731 of a second software application that has been executed in the foreground state just before the first software application is executed in the foreground state, a portion of the user interface 733 of a third software application that has been executed in the foreground state just before the second software application is executed in the foreground state, and a portion of the user interface 735 of a fourth software application that has been executed in the foreground state just before the third software application is executed in the foreground state. In the second state 720, the processor 120 may provide a visual effect including the user interface 710 of the first software application partially superimposed on the user interface 731 of the second software application, the user interface 731 of the second software application partially superimposed on the user interface 733 of the third software application, and the user interface 733 of the third software application partially superimposed on the user interface 735 of the fourth software application.

Meanwhile, although not shown in FIG. 7, in the second state 720, a portion of the user interface 731 of the second software application, a portion of the user interface 733 of the third software application, and a portion of the user interface 735 of the fourth software application may be displayed with a blur effect (i.e., blurred).

In an embodiment, a width of each of the portion of the user interface 731 of the second software application, the portion of the user interface 733 of the third software application, and the portion of the user interface 735 of the fourth software application may be identified, based on a distance between a periphery 737 and a periphery 739 of the user interface 710 of the electronic device 101 from which the display 205 is slid out according to the extension of the display area of the display 205 in the first direction 725, and the number of software applications that have been executed before the first software application is executed in the foreground state. For example, the periphery 739 may be a periphery closest to the periphery 737 among peripheries of the user interface 710 parallel to the periphery 737. For example, the processor 120 may identify the width using the following equation 1, and display, based on the identified width, the portion of the user interface 731 of the second software application, the portion of the user interface 733 of the third software application, and the portion of the user interface 735 of the fourth software application.

$$\Delta D = \frac{D_f}{N_r - 1} \qquad \text{[Equation 1]}$$

wherein, $D_f$ is a distance between the periphery 739 of the user interface 710 and the periphery 737 of the housing of the electronic device 101, $N_r$ is the number of the software applications executed before the execution of the first software application (or the number of the software applications respectively providing the user interfaces displayed within the portion 729 of the display area), and $\Delta D$ is the width of each of the portion of the user interface 731 of the second software application, the portion of the user interface 733 of the third software application, and the portion of the user interface 735 of the fourth software application.

Meanwhile, the processor 120 may change the second state 720 to the third state 740 based on identifying completion of the extension of the display area of the display 205. For example, in the third state 740, the electronic device 101 may be in the second state 250. However, the present disclosure is not limited thereto. For example, in the third state 740, the processor 120 may move the user interface 710 moved in the second direction 727, in a third direction 741 opposite to the second direction 727, based on identifying the completion of the extension of the display area of the display 205. For example, in the third state 740, the processor 120 may move the visual objects in the user interface 710 in the third direction 741 and extend the user interface 710 in the third direction 741. For example, in the fourth state 745 changed from the third state 740, the processor 120 may display the user interface 710 having an enlarged size via the display area having an enlarged size.

Referring again to FIG. 4, in an embodiment, the processor 120 may identify whether the distance in which the image is moved or the display area of the display 205 is extended reaches a preset distance, while the display area of the display 205 is extended. The processor 120 may, on condition that the distance reaches the preset distance while the display area of the display 205 is extended, cease moving the image, and extend the image fixed by the ceasing of the movement of the image, in a direction identified based on the direction of the extension of the display area of the display 205.

For example, FIG. 8, the processor 120 may change the second state 520 to a sixth state 800, based on identifying that the distance reaches the preset distance. For example, in the sixth state 800, the electronic device 101 may be in the intermediate state defined through the description of FIG. 2. However, the present disclosure is not limited thereto. For example, in the sixth state 800, the processor 120 may, in response to identifying that the distance reaches the preset distance, cease the movement of the image 510 and extend the image 510 in a second direction 802 opposite to the first direction 525. The remaining portion of the image 510 that was not displayed in the second state 520 according to the movement of the image 510 may appear by the extension of the image 510 in the sixth state 800. The processor 120 may change the sixth state 800 to a seventh state 810 based on identifying completion of the extension of the display area of the display 205. For example, in the seventh state 810, the electronic device 101 may be in the second state 250. However, the present disclosure is not limited thereto. For example, in the seventh state 810, the image 510 having an enlarged size may be displayed in the display area of the display 205.

Referring again to FIG. 4, in an embodiment, the processor 120 may display additional information in a portion of the display area including the first space formed according to the movement of the image and the second space newly exposed according to the extension of the display 205, while the display area of the display 205 is extended. For example, the additional information may include the information on the user interfaces of the software applications illustrated through FIG. 7 and its related description. For example, the additional information may include information on notifications generated in the electronic device 101, update information of an operating system (OS) of the electronic device 101, local time information, weather information, usage history information of the electronic device 101, and/or information on the time when a software application providing a user interface, which is the image, was executed in the foreground state.

Figure 9:
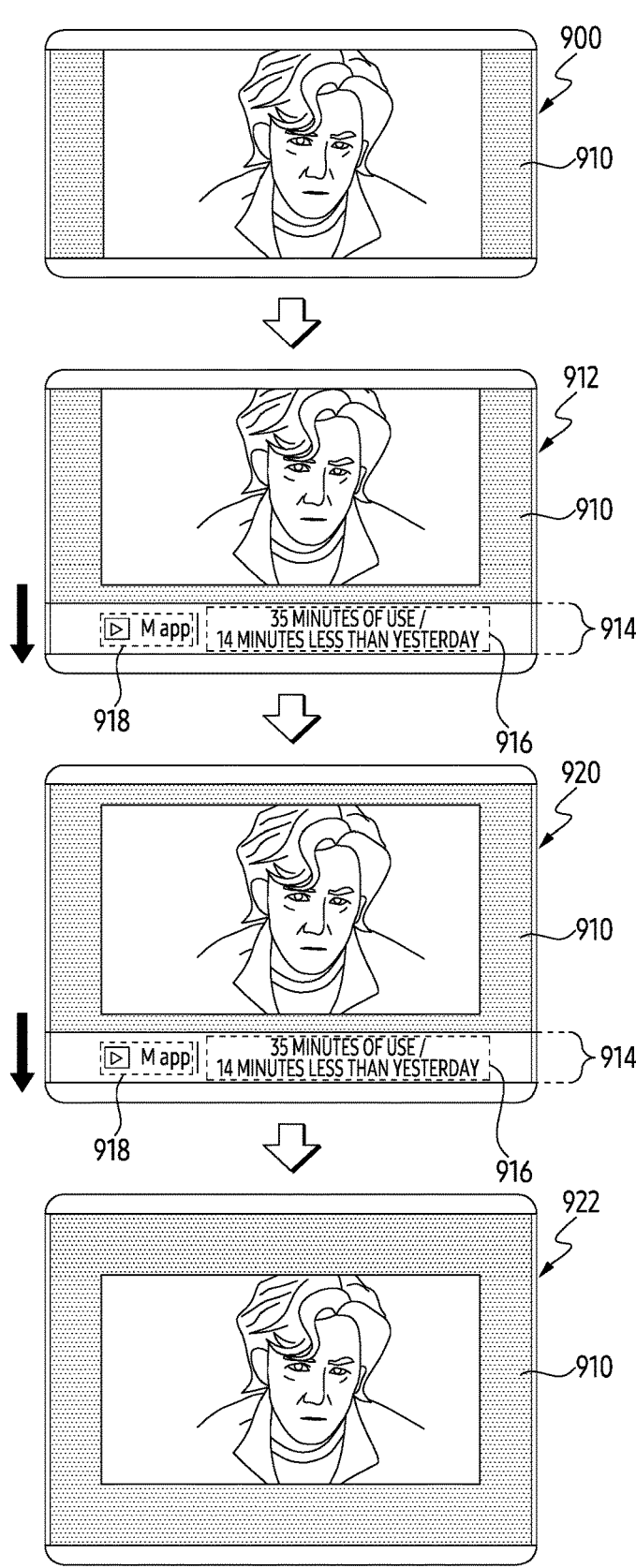
FIGS. 9 to 12 illustrate exemplary additional information displayed together with an image including a user interface of a software application, according to an embodiment.

For example, referring now to FIG. 9, in a first state 900, the processor 120 may display a user interface 910 of a software application providing a video streaming service. For example, in the first state 900, the electronic device 101 may be in the first state 210. However, the present disclosure is not limited thereto. For example, the processor 120 may identify the extension of the display area of the display 205 while the user interface 910 is displayed in the first state 900. The processor 120 may change the first state 900 to a second state 912 based on identifying the extension of the display area of the display 205. For example, in the second state 912, the electronic device 101 may be in the intermediate state defined through the description of FIG. 2. For example, in the second state 912, while the display area of the display 205 is extended, the processor 120 may move the user interface 910 according to the extension of the display area of the display 205 while the display area of the display 205 is extended. In the second state 912, the processor 120 may display information 916 about the time when the software application was executed in the foreground state, in a portion 914 of the display area including the first space formed according to the movement of the user interface 910 and the second space newly exposed according to the extension of the display area of the display 205. In an embodiment, processor 120 may further display, within the portion 914 of the display area, a visual object 918 representing the software application along with the information 916.

Meanwhile, while displaying the user interface 910 moved according to the extension of the display area of the display 205 as in the second state 912, the processor 120 may identify whether a distance in which the user interface 910 is moved or the display area of the display 205 is extended reaches the preset distance. The processor 120 may change the second state 912 to a third state 920 based on identifying that the distance reaches the preset distance. For example, in the third state 920, the electronic device 101 may be in the intermediate state defined through the description of FIG. 2. However, the present disclosure is not limited thereto. For example, in the third state 920, the processor 120 may cease the movement of the user interface 910 and extend the ceased user interface 910 in another direction opposite to the direction in which the display area of the display 205 is extended. For example, the processor 120 may display a portion of the user interface 910 not displayed through the display 205 by the movement of the user interface 910, as in the third state 920, extending the user interface 910 with its movement being ceased. For example, in the third state 920, the processor 120 may cause the portion of user interface 910 to appear through the display 205. Meanwhile, while the user interface 910 is extended as in the third state 920, the processor 120 may maintain displaying the information 916 in the portion 914 of the display area. For example, the displaying of the information 916 may be maintained until completion of the extension of the display area of display 205. For example, the processor 120 can change the third state 920 to a fourth state 922 based on identifying the completion of the extension of the display area of the display 205. For example, in the fourth state 922, the electronic device 101 may be in the second state 250. However, the present disclosure is not limited thereto. For example, in the fourth state 922, the processor 120 may display the user interface 910 in the display area having a size enlarged according to the extension of the display area of the display 205. Meanwhile, in the fourth state 922, the displaying of the information 916 may be ceased. As described above, while the display area of the display 205 is extended, the electronic device 101 may display the information 916 on the execution time of the software application, so that the user can recognize the usage time of the software application.

Figure 10:
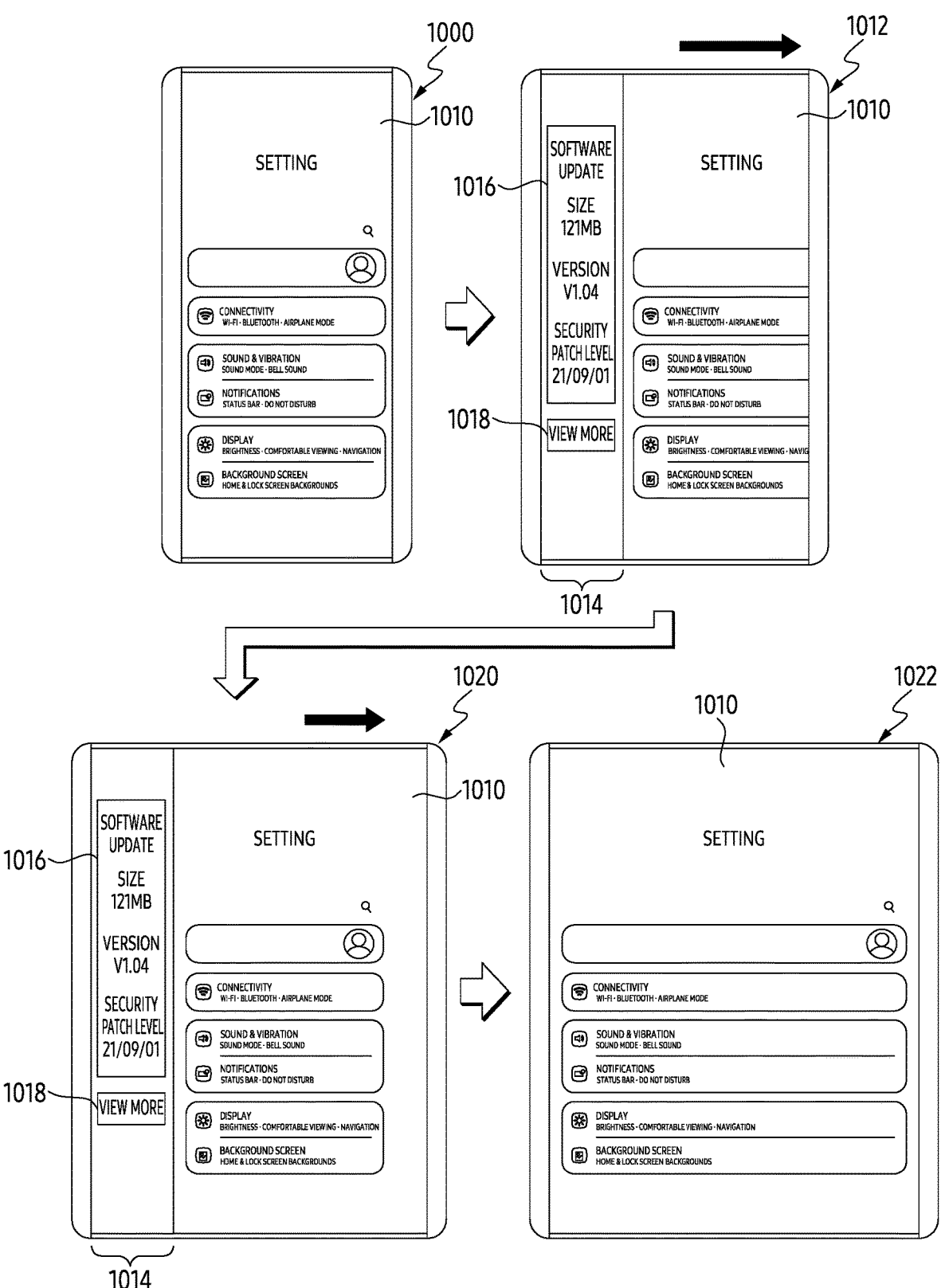

For another example, referring to FIG. 10, the processor 120 may display a user interface 1010 of a software application providing a user setting service, in a first state 1000. For example, in the first state 1000, the electronic device 101 may be in the first state 210. However, the present disclosure is not limited thereto. For example, the processor 120 may identify the extension of the display area of the display 205 while the user interface 1010 is displayed in the first state 1000. The processor 120 may change the first state 1000 to a second state 1012 based on identifying the extension of the display area of the display 205. For example, in the second state 1012, the electronic device 101 may be in the intermediate state defined through the description of FIG. 2. However, the present disclosure is not limited thereto. For example, in the second state 1012, the processor 120 may move the user interface 1010 according to the extension of the display area of the display 205. In the second state 1012, the processor 120 may display, while the display area of the display 205 is extended, update information 1016 of the OS of the electronic device 101, in a portion 1014 of the display area including a first space formed according to the movement of the user interface 1010 and a second space newly exposed according to the extension of the display area of the display 205. For example, the update information 1016 may include information on a current version of the OS of the electronic device 101. For example, the update information 1016 may include size information of the OS installed in the electronic device 101. For example, the update information 1016 may include information on the date when the security patch was applied to the OS. In an embodiment, the update information 1016 may be displayed along with an executable object 1018 for viewing detailed information on the update information 1016. Although not shown in FIG. 10, in an embodiment, when there is an update of the OS that has not yet been applied to the electronic device 101, the processor 120 may further display an executable object for executing the update of the OS that has not yet been applied to the electronic device 101, in the portion 1014 of the display area.

Meanwhile, while displaying the user interface 1010 moved according to the extension of the display area of the display 205 as in the second state 1012, the processor 120 may identify whether a distance in which the user interface 1010 was moved or a distance in which the display area of the display 205 is extended reaches the preset distance. The processor 120 may change the second state 1012 to a third state 1020 based on identifying that the distance reaches the preset distance. For example, in the third state 1020, the electronic device 101 may be in the intermediate state defined through the description of FIG. 2. However, the present disclosure is not limited thereto. For example, in the third state 1020, the processor 120 may cease the movement of the user interface 1010, and extend the user interface 1010 of which movement is ceased, in another direction opposite to the direction in which the display area of the display 205 is extended. For example, the processor 120 may display a portion of the user interface 1010 that was not displayed through the display 205 by the movement of the user interface 1010, as in the third state 1020, by extending the user interface 1010 of which the movement is ceased. For example, in the third state 1020, the processor 120 may cause the portion of user interface 1010 to appear via the display 205. Meanwhile, while the user interface 1010 is extended as in the third state 1020, the processor 120 may maintain displaying the update information 1016 in the portion 1014 of the display area. For example, the displaying of the update information 1016 may be maintained until completion of the extension of the display area of the display 205. For example, the processor 120 may change the third state 1020 to a fourth state 1022 based on identifying the completion of the extension of the display area of the display 205. For example, in the fourth state 1022, the electronic device 101 may be in the second state 250. However, the present disclosure is not limited thereto. For example, in the fourth state 1022, the processor 120 may display the user interface 1010 in the display area having a size enlarged according to the extension of the display area of the display 205. Meanwhile, in the fourth state 1022, the displaying of the update information 1016 may be ceased. As described above, while the display area of the display 205 is extended, the electronic device 101 May display the update information 1016 so that the user can recognize the update state of the OS of the electronic device 101.

Figure 11:
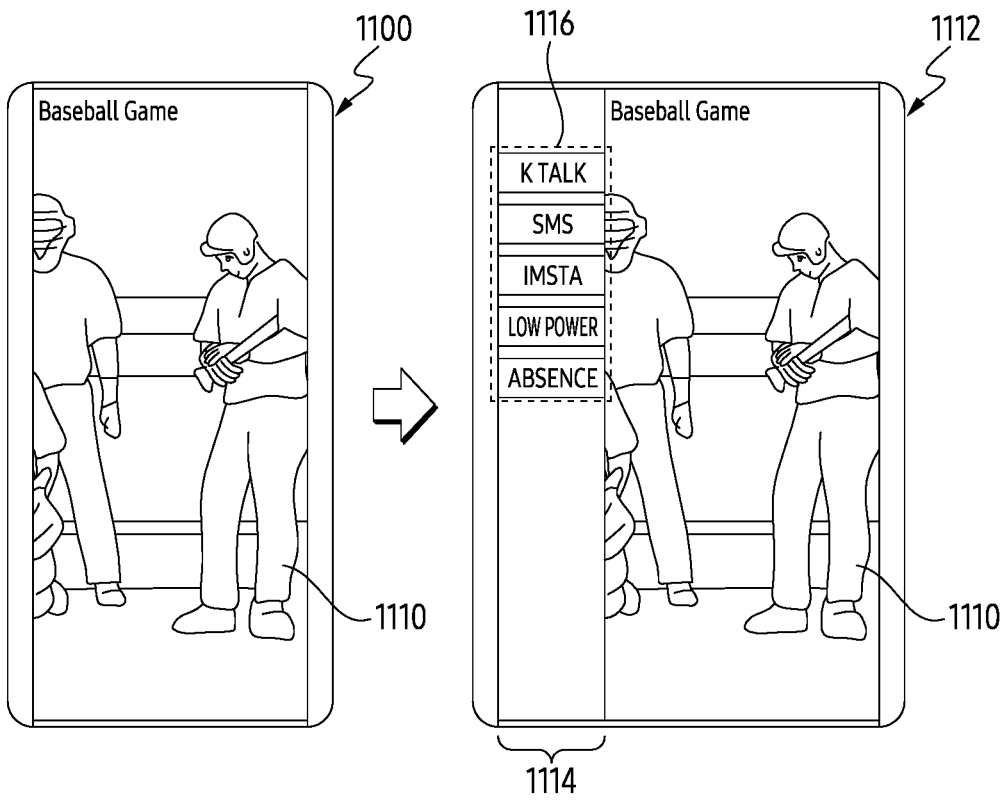

As another example, referring to FIG. 11, the processor 120 may display a user interface 1110 of a software application providing an online game service in a first state 1100. For example, in the first state 1100, the electronic device 101 may be in the first state 210. However, the present disclosure is not limited thereto. For example, the processor 120 may identify extension of the display area of the display 205 while the user interface 1110 is displayed in the first state 1100. The processor 120 may change the first state 1100 to a second state 1112 based on identifying the extension of the display area of the display 205. For example, in the second state 1112, the electronic device 101 may be in the intermediate state defined through the description of FIG. 2. However, the present disclosure is not limited thereto. For example, in the second state 1112, the processor 120 may include information 1116 on notifications generated in the electronic device 101, in a portion 1114 of the display area including a first space formed according to the movement of the user interface 1110 and a second space newly exposed according to the extension of the display area of the display 205, while the display area of the display 205 is extended. For example, the information 1116 may include executable objects indicating each of the notifications. For example, in response to a user input to an executable object of the executable objects in the information 1116, the processor 120 may execute a software application associated with the executable object in the foreground state. For example, the processor 120 may change the user interface 1110 to a user interface of the software application related to the executable object, based on the execution of the software application associated with the executable object. As described above, while the display area of the display 205 is extended, the processor 120 may display the information 1116 so that a user may recognize at least one notification that has not been inquired by the user among the notifications generated in the electronic device 101 by the user.

Figure 12:
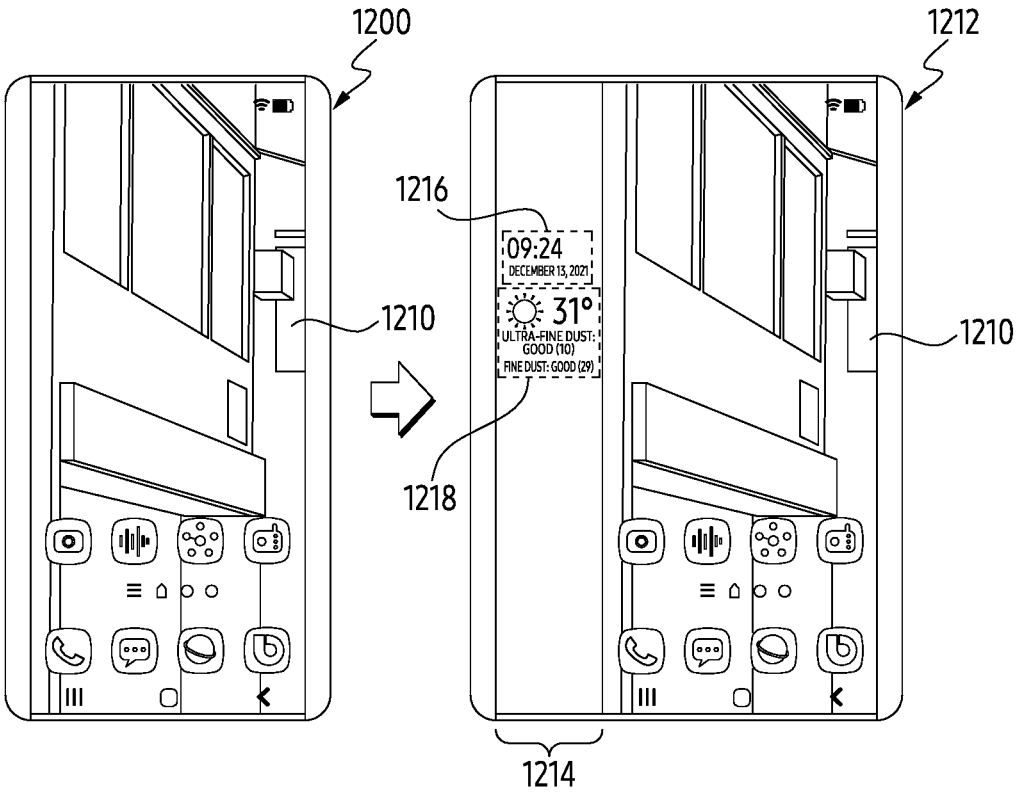

As another example, referring to FIG. 12, the processor 120 may display a wallpaper 1210 in a first state 1200. For example, in the first state 1200, the electronic device 101 may be in the first state 210. However, the present disclosure is not limited thereto. For example, the processor 120 may identify extension of the display area of the display 205 while the wallpaper 1210 is displayed in the first state 1200. The processor 120 may change the first state 1200 to a second state 1212 based on the identification. For example, in the second state 1212, the electronic device 101 may be in the intermediate state defined through the description of FIG. 2. However, the present disclosure is not limited thereto. For example, in the second state 1212, the processor 120 may move the wallpaper 1210 according to the extension of the display area of the display 205 while the display area of the display 205 is extended. In the second state 1212, while the display area of the display 205 is extended, the processor 120 may display local time information 1216 and/or weather information 1218, in a portion 1214 of the display area including a first space formed according to the movement of the wallpaper 1210 and a second space newly exposed according to the extension of the display area of the display 205. Although FIG. 12 illustrates an example of displaying the local time information 1216 and/or the weather information 1218, it is only for convenience of description. For example, the processor 120 may display information most frequently queried by the user of the electronic device 101 in the portion 1214 of the display area, while the display area of the display 205 is extended. The information most frequently queried by the user may be obtained via a neural network in the electronic device 101 or a neural network related to the electronic device 101, based on a usage history of the electronic device 101. As described above, the electronic device 101 may display the information frequently queried with the electronic device 101 or information preferred by the user of the electronic device 101, while the display area of the display 205 is extended, thereby providing an enhanced user experience.

Referring again to FIG. 4, in an embodiment, the processor 120, while the display area of the display 205 is extended, may move the visual object in the image that was displayed before the display area of the display 205 is extended, and newly display another visual object extending from a portion of the moved visual object. For example, the processor 120 may change the representation of the image as displaying an animation of moving at least a portion of the visual object in the image, while the display area of the display 205 is extended.

For example, FIG. 13, in the third state 540, the processor 120 may display an image 510 including a visual object 550 moved in the third direction 545, while the display area of the display 205 is extended. The processor 120 may change the third state 540 to an eighth state 1300 while the visual object 550 is moved according to the extension of the display area of the display 205. For example, in the eighth state 1300, the electronic device 101 may be in the intermediate state defined through the description of FIG. 2. However, the present disclosure is not limited thereto. For example, in the eighth state 1300, the processor 120 may display, in the image 510, a new visual object 1310 that was not displayed in the third state 540. For example, the visual object 1310 may appear from a periphery 1312 of the housing of the electronic device 101 from which the display 205 is drawn out. In an embodiment, the visual object 1310 may be a visual object distinct from the visual object 550. In an embodiment, the visual object 1310 may be a visual object integrated with the visual object 550. For example, the visual object 550 and the visual object 1310 may form a single shape. For example, the visual object 1310 may include a portion extending from a portion of the visual object 550. For example, while the display area of the display 205 is extended, the processor 120 may provide an animation of moving the visual object 1310 (e.g., at least another portion of the visual object 550) extending from at least the portion of the visual object 550, in a portion of the display area newly exposed according to the extension of the display area of the display 205.

For example, Referring now to FIG. 14, in a first state 1400, the processor 120 may display an image 1410. For example, in the first state 1400, the electronic device 101 may be in the first state 210. However, the present disclosure is not limited thereto. In an embodiment, the image 1410 may include a visual object corresponding to waves. Although not shown in FIG. 14, the image 1410 may be displayed together with at least one executable object for executing at least one software application. For example, the image 1410 may be a background image of a wallpaper including the at least one executable object. The processor 120 may identify extension of the display area of the display 205 while the image 1410 is displayed. The processor 120 may change the first state 1400 to a second state 1415 based on the identification. For example, in the second state 1415, the electronic device 101 may be in the intermediate state defined through the description of FIG. 2. However, the present disclosure is not limited thereto. For example, in the second state 1415, the processor 120 may move the visual object in the image 1410 according to the extension of the display area of the display 205. For example, in the second state 1415, a portion of the visual object in the image 1410 displayed in the first state 1400 may be moved in a direction 1420 opposite to the direction in which the display area of the display 205 is extended, and another portion of the visual object extending from a portion of the visual object may appear within the image 1410 according to the extension of the display area of display 205. For example, the processor 120 may provide an animation in which the visual object is moved in the direction 1420, in the second state 1415. In an embodiment, the speed of the visual object moved to provide the animation may correspond to a speed at which the display area of the display 205 is extended.

Meanwhile, although not shown in FIG. 14, when the image 1410 is the background image of the wallpaper, the at least one executable object displayed together with the image 1410 may have a movement distinct from the movement of the visual object. For example, the at least one executable object may be fixed, as opposed to the visual object. For another example, the at least one executable object may have a movement distinct from the movement of the visual object for an arrangement changed within the wallpaper having an enlarged size according to the extension of the display area of the display 205. As described above, the wallpaper may include the image 1410 for providing an animation that is moved according to the extension of the display area of the display 205, as a background image. In an embodiment, the background image (e.g., the image 1410) of the wallpaper may be downloaded from a server sharing various background images. In an embodiment, the background image may be obtained from another electronic device of another user distinct from the user of the electronic device 101. For example, information on the background image may be received from the other electronic device via a direct communication path (e.g., Bluetooth communication path, BLE communication path, or NFC) between the electronic device 101 and the other electronic device.

In an embodiment, the background image may be obtained within the electronic device 101 without communicating with another electronic device, based on a user manipulation. For example, the background image may be configured to change the representation while the display area of the display 205 viewed from one side of the electronic device 101 is extended or reduced. For example, a user of another electronic device or a user of the electronic device 101 may manipulate at least one of attribute information, object information, color information, or substitution image, which are included in the background image, to change the representation of the background image. For example, the attribute information, the object information, the color information, and/or the replacement image, which are changeable via the user's manipulation, may be associated with extension or reduction of the display area. In an embodiment, the background image may include a first file in image format (e.g., JPG, PNG, or GIF) and a second file including information for changing the representation of the background image. In an embodiment, the background image may be configured as a single file including both information in the first file and information in the second file. However, the present disclosure is not limited thereto.

For example, the manipulation may include selecting a plurality of still images. For example, the plurality of still images may respectively include visual objects having different postures. For example, a first still image of the plurality of still images may include the visual object having a first posture, and a second still image of the plurality of still images may include the visual object having a second posture distinct from the first posture. In an embodiment, the processor 120 may obtain a third still images, which is a new image, based on the first still image and the second still image, to provide an animation using the first still image and the second still image. For example, the processor 120 may extract first feature points of the visual object having the first posture, and second feature points of the visual object having the second posture. The processor 120 may identify a local movement of the visual object caused by changing the first posture to the second posture, based on a difference between the first feature points and the second feature points. The processor 120 may identify a third posture that is an intermediate posture between the first posture and the second posture based on the identified local movement, and may obtain a third still image, which is a new image including the visual object having the third posture. The processor 120 may provide the animation reproduced according to a change in size of the display area of the display 205, based on the first still image, the second still image, and the third still image. However, the present disclosure is not limited thereto.

As another example, referring to FIG. 15, in a first state 1500, the processor 120 may display an image 1520 including a portion of a visual object 1510. For example, in the first state 1500, the electronic device 101 may be in the first state 210. In an embodiment, the image 1520 may be displayed along with executable objects for executing each of the software applications. For example, the image 1520 may be a background image of a wallpaper including the executable objects. The processor 120 may identify extension of the display area of the display 205, while the image 1520 is displayed. The processor 120 may change the first state 1500 to a second state 1530 based on the identification. For example, in the second state 1530, the electronic device 101 may be in the intermediate state defined through the description of FIG. 2. However, the present disclosure is not limited thereto. For example, in the second state 1530, the processor 120 may move the portion of the visual object 1510 within the image 1520 according to the extension of the display area of the display 205. For example, in the second state 1530, the portion of the visual object 1510 that was displayed in the first state 1500 may be moved in a direction 1535 opposite to the direction in which the display area of the display 205 is extended, and another portion (e.g., a seat portion of a bicycle) of the visual object 1510 extending from the portion of the visual object 1510 may appear within the image 1520 according to the extension of the display area of the display 205. For example, the processor 120 may provide an animation in which the visual object 1510 is moved in the direction 1535 in the second state 1530. In an embodiment, a speed of the visual object 1510 that is moved to provide the animation or a speed of rotation of at least one visual element (e.g., bicycle wheels) within the visual object 1510 may correspond to the speed at which the display area of the display 205 is extended.

In the meantime, although not shown in FIG. 15, when the image 1520 is a background image of a wallpaper, the executable objects superimposed on the image 1520 may have movement distinct from the movement of the visual object 1510. For example, the executable objects may be fixed, as opposed to the visual object 1510. For another example, the executable objects may have movement distinct from the movement of the visual object 1510 for an arrangement changed within the wallpaper having an enlarged size according to the extension of the display area of the display 205. For example, the visual object 1510 is moved in the direction 1535, whereas some of the executable objects may be moved in a direction opposite to the direction 1535 so as to be spaced apart from other portions of the executable objects, within the wallpaper having the enlarged size. As described above, the wallpaper may include a background image (e.g., the image 1520) including a visual object moved according to the extension of the display area of the display 205, so that the user can recognize that the display area of the display 205 is being extended.

Referring again to FIG. 4, in an embodiment, while the display area of the display 205 is extended, the processor 120 may change the representation of the image, as rotating a visual object within an image of a three-dimensional (3D) shape in a direction corresponding to the direction in which the display area of the display 205 is extended. In an embodiment, a speed of the rotation of the visual object may vary depending on the speed at which the display area of the display 205 is extended.

For example, FIG. 16, in a first state 1600, the processor 120 may display an image 1620 including at least one visual object 1610 of a 3D shape. For example, in the first state 1600, the electronic device 101 may be in the first state 210. However, the present disclosure is not limited thereto. In an embodiment, the image 1620 may be displayed along with executable objects (or visual information) for executing each of software applications. In an embodiment, the executable objects (or the visual information) may be superimposed on the image 1620. For example, the image 1620 may be a background image of a wallpaper (lock screen) including the executable objects (or the visual information). The processor 120 may identify extension of the display area of the display 205 while the image 1620 is displayed. The processor 120 may change the first state 1600 to a second state 1630 based on the identification. For example, in the second state 1630, the electronic device 101 may be in the intermediate state defined through the description of FIG. 2. However, the present disclosure is not limited thereto. For example, in the second state 1630, the processor 120 may rotate the visual object 1610 according to the extension of the display area of the display 205. For example, the visual object 1610 in the second state 1630 may rotate in a direction corresponding to a direction 1635 in which the display area of the display 205 is extended. For example, in the second state 1630, the visual object 1610 may be rotated clockwise or counter-clockwise. For example, in the second state 1630, an orientation of the visual object 1610 may be changed depending on progressing of the extension of the display area of the display 205. In an embodiment, a speed at which the visual object 1610 is rotated may vary depending on the speed at which the display area of the display 205 is extended. Meanwhile, although not shown in FIG. 16, as opposed to the visual object 1610, each of the executable objects may have the orientation kept independently of the extension of the display area of the display 205. As described above, the electronic device 101 may display an image including a visual object rotated according to the extension of the display area of the display 205. The electronic device 101 may provide a seamless user experience while the display area of the display 205 is extended, owing to such an image representation.

Referring again to FIG. 4, in an embodiment, while displaying an image comprising a visual object having a two-dimensional (2D) shape, the processor 120 may identify the extension of the display area of the display 205, and change the representation of the image, as changing the shape of the visual object from the 2D shape to the 3D shape in response to the identification and then rotating the visual object having the 3D shape in a direction corresponding to the direction of the extension of the display area of the display 205. In an embodiment, the speed of the rotation of the visual object may be changed depending on the speed of the extension of the display area of the display 205.

For example, FIG. 17, in a first state 1700, the processor 120 may display an image 1720 including visual objects 1710 having the 2D shape. For example, in the first state 1700, the electronic device 101 may be in the first state 210. However, the present disclosure is not limited thereto. In an embodiment, the image 1720 may be displayed along with executable objects (or visual information) for executing software applications respectively. In an embodiment, the executable objects (or the visual information) may be superimposed on the image 1720. For example, the image 1720 may be a background image of a wallpaper (lock screen) including the executable objects (or the visual information). The processor 120 may identify extension of the display area of the display 205 while the image 1720 is displayed. The processor 120 may change the first state 1700 to a second state 1730 in response to the identification. For example, in the second state 1730, the electronic device 101 may be in the intermediate state defined through the description of FIG. 2. However, the present disclosure is not limited thereto. For example, in the second state 1730 provided immediately after the identification, the processor 120 may change the shape of each of the visual objects 1710 from the 2D shape to the 3D shape. For example, according to the change to the 3D shape, a visual effect in which each of the visual objects 1710 protrudes from the display 205 may be provided in the second state 1730. Meanwhile, although not shown in FIG. 17, in the second state 1730, the shape of the executable objects (or the visual information) may be kept in the 2D shape, as opposed to the visual objects 1710.

In an embodiment, the processor 120 may provide the second state 1730 and then provide the third state 1750 while the display area of the display 205 is extended. For example, in the third state 1750, the electronic device 101 may be in the intermediate state defined through the description of FIG. 2. However, the present disclosure is not limited thereto. For example, each of the visual objects 1710 having the 3D shape in the third state 1750 may rotate in a direction corresponding to the direction 1735 of the extension of the display area of the display 205. For example, in the third state 1750, each of the visual objects 1710 may be rotated clockwise or counterclockwise. In an embodiment, the timing at which rotation of some of the visual objects 1710 is started may be different from the timing at which rotation of the other of the visual objects 1710 is started. For example, the processor 120 may control the rotation of the visual objects 1710 based on the orientation 1735 to provide a seamless user experience while the display area of the display 205 is extended. For example, in the third state 1750, while the display area of the display 205 is extended, the processor 120 may initiate rotation of the visual objects 1755 and then initiate rotation of the visual objects 1760, and initiate rotation of the visual objects 1760 and then initiate rotation of the visual objects 1765. Meanwhile, although not shown in FIG. 17, as opposed to the visual objects 1710, each of the executable objects may have an orientation kept independently of the extension of the display area of the display 205. As described above, the electronic device 101 may display an image including a visual object rotating after the shape is changed depending on the extension of the display area of the display 205. The electronic device 101 may provide a seamless user experience while the display area of the display 205 is extended, owing to such an image representation.

Figure 18:
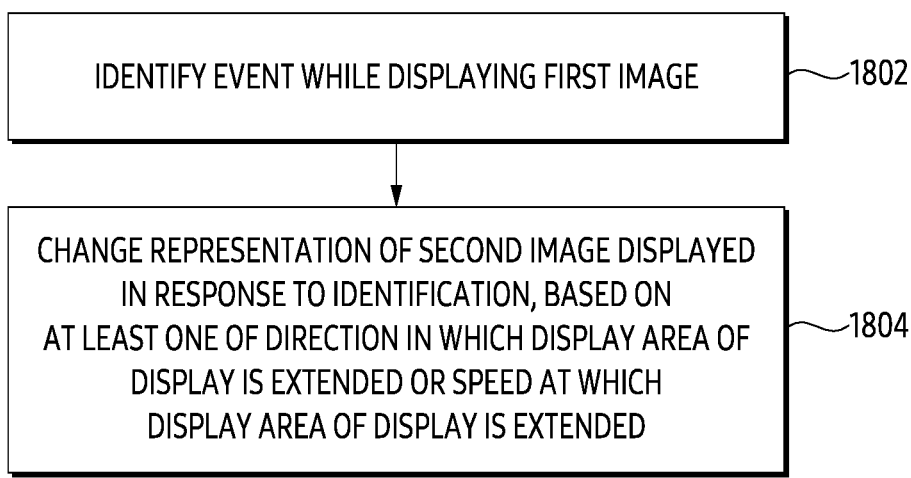
FIG. 18 is a flowchart illustrating a method of displaying a new image based on extension of a display area of a display, according to an embodiment.

FIG. 18 is a flowchart illustrating a method of displaying a new image based on extension of a display area of a display, according to an embodiment. This method may be executed by the electronic device 101 shown in FIG. 1, the electronic device 101 shown in FIG. 2, the electronic device 101 shown in FIGS. 3A and 3B, or the processor 120 of the electronic device 101 shown in FIG. 1.

Figure 19:
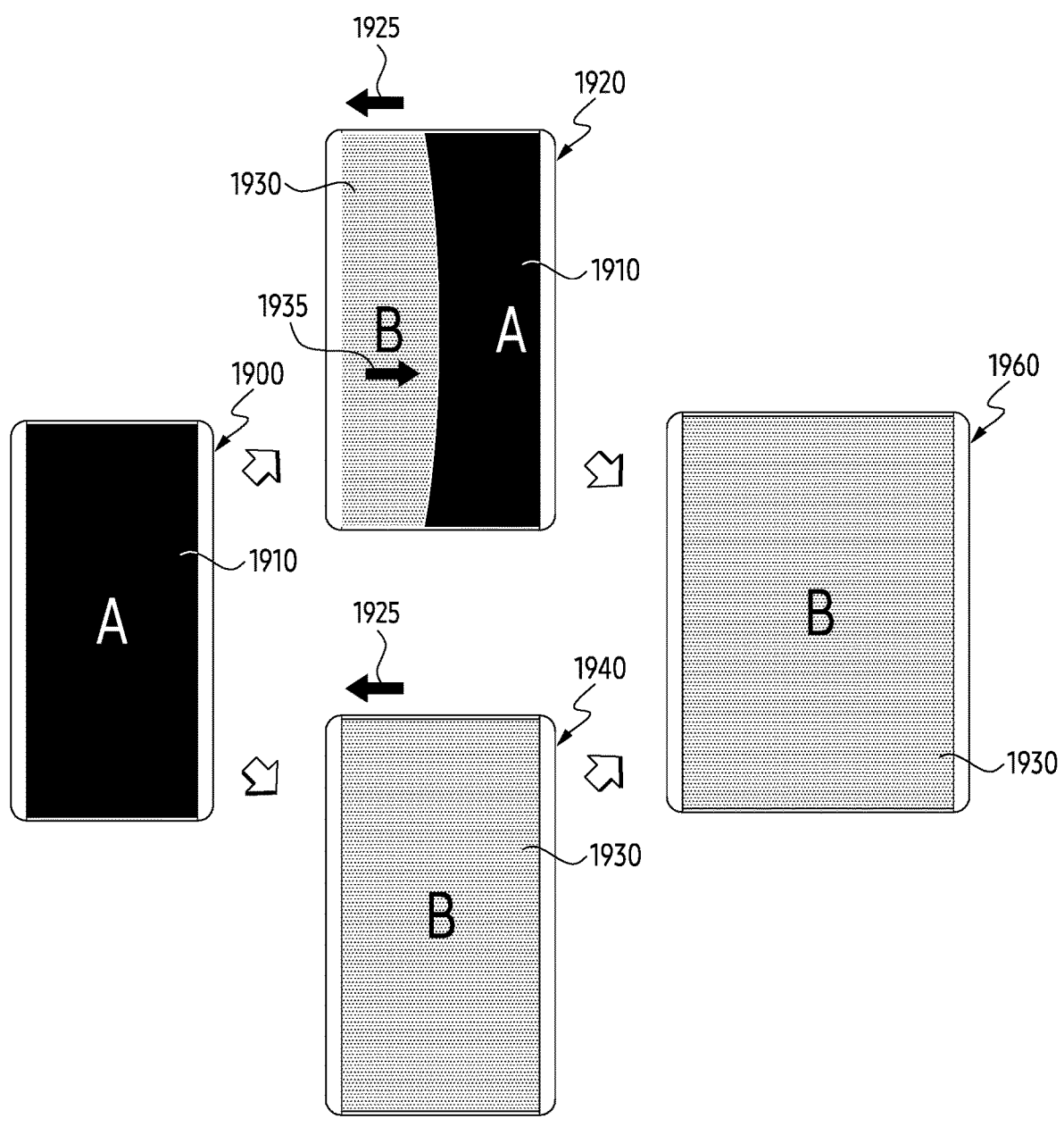
FIG. 19 illustrates an exemplary image that is extended or switched based on extension of a display area of a display, according to one embodiment.

FIG. 19 illustrates an exemplary image that is extended or switched based on extension of a display area of a display, according to an embodiment.

Figure 20A:
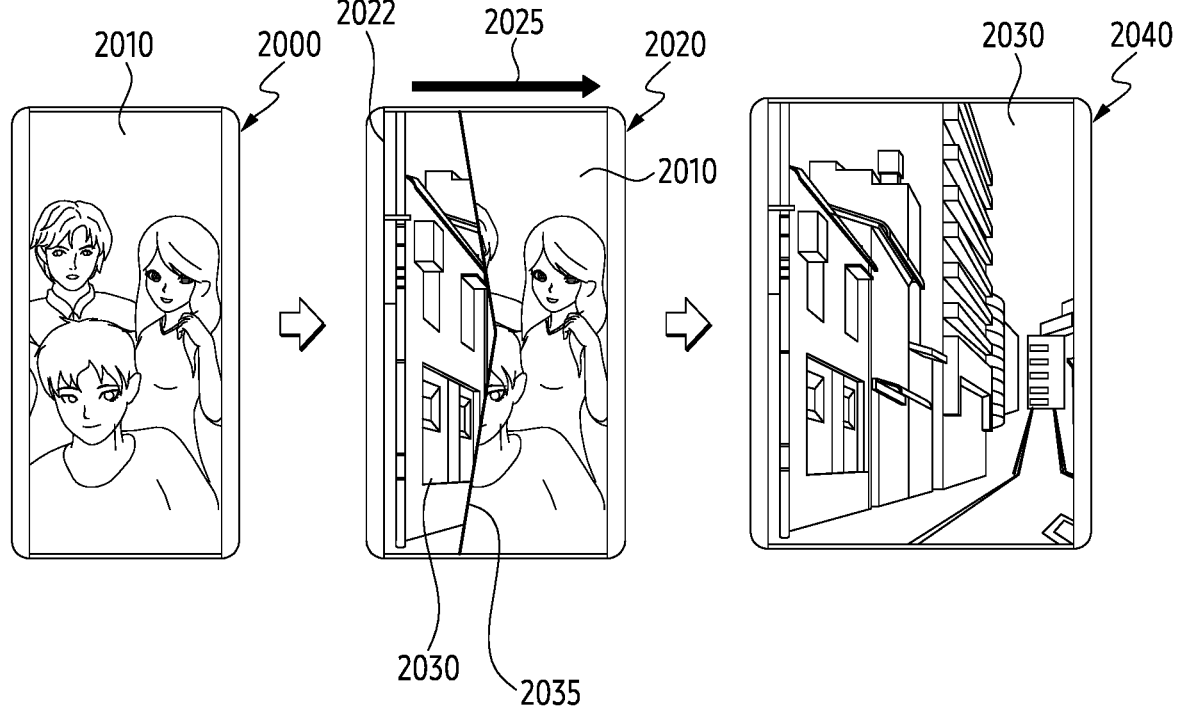
FIG. 20A illustrates an exemplary second image extending by superimposing on a first image based on extension of a display area of a display, according to one embodiment.

FIG. 20A illustrates an exemplary second image extending superimposed on a first image based on extension of a display area of a display, according to one embodiment.

Figure 20B:
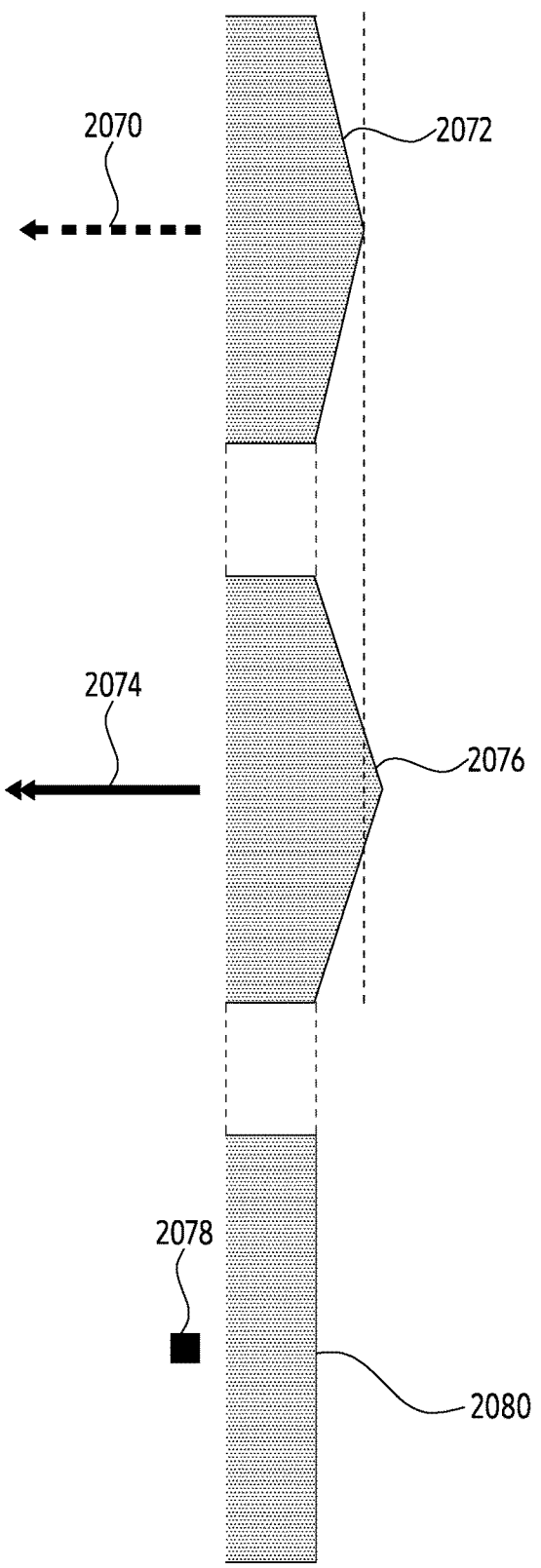
FIG. 20B illustrates an exemplary shape of at least one periphery of a second image changed based on a speed a display area of a display is extended, according to one embodiment.

FIG. 20B illustrates an exemplary shape of at least one periphery of a second image that changes based on a speed at which a display area of a display is extended, according to one embodiment.

Figure 21:
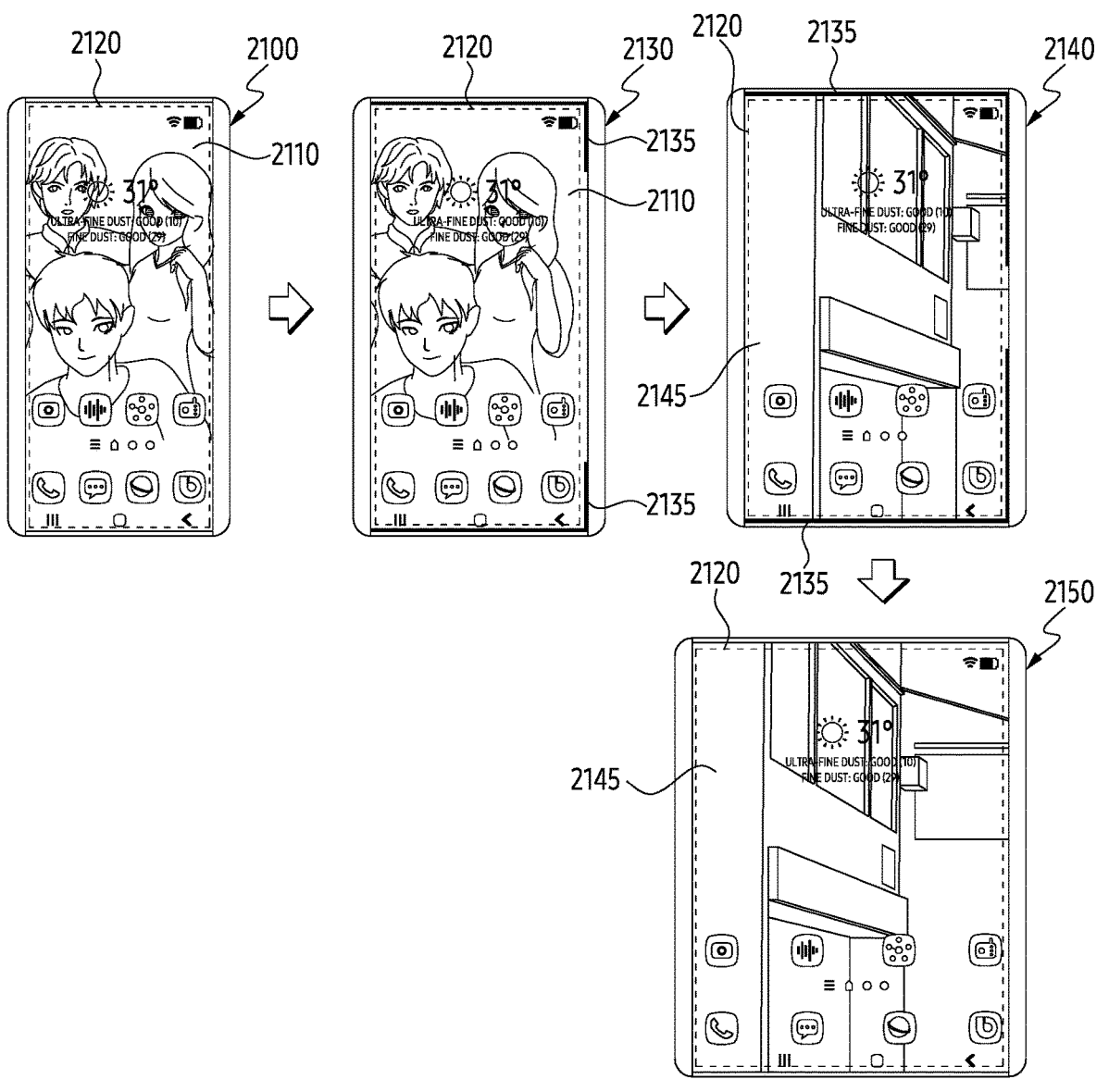
FIG. 21 illustrates an exemplary second image switched from a first image and edged with a visual object, based on extension of a display area of a display, according to one embodiment.

FIG. 21 illustrates an exemplary second image switched from a first image and edged with a visual object based on extension of a display area of a display, according to one embodiment.

Referring first to FIG. 18, in operation 1802, the processor 120 may identify an event in which the display area exposed outside the housing is extended, while a first image is displayed in the display area of the display 205 exposed outside the housing (e.g., the first housing 201 illustrated in FIG. 2). The following description exemplifies operations when the display area is extended, but this is only for convenience of description. For example, the event may include changing a size of the display area of the display 205. In an embodiment, the processor 120 may identify the event in which the display area is reduced in operation 402.

For example, the first image may be an image defined through the description of FIG. 4. For example, the extension of the display area of the display 205 may be caused based on a user input defined through the description of FIG. 4. For example, the identification may be executed based on the methods defined through the description of FIG. 4.

In operation 1804, the processor 120, while the display area of the display 205 is extended, may change a representation of the second image displayed in response to the identification, based on at least one of a direction in which the display area of the display 205 is extended or a speed at which the display area of the display 205 is extended. For example, the direction in which the display area of the display 205 is extended may be identified based on the methods defined through the description of FIG. 4. For example, the speed at which the display area of the display 205 is extended may be identified based on the methods defined through the description of FIG. 4.

In an embodiment, changing the representation of the second image may include moving the second image. In an embodiment, changing the representation of the second image may include changing the size of the second image. For example, the size of the second image may be enlarged based on the size of the extended display area. In an embodiment, changing the representation of the second image may include rotating at least a portion of the second image. In an embodiment, changing the representation of the second image may include changing at least a portion of the color of the second image. In an embodiment, changing the representation of the second image may include changing the brightness of at least a portion of the second image. In an embodiment, changing the representation of the second image may include applying a visual effect to at least a portion of the second image. In an embodiment, changing the representation of the second image may include moving at least one visual object of a plurality of visual objects in the second image. In an embodiment, changing the representation of the second image may include changing a shape of a visual object in the second image. For example, the shape of the visual object may be changed from the 2D shape to the 3D shape according to the extension of the display area of the display 205. In an embodiment, changing the representation of the second image may include rotating a visual object in the second image. For example, the visual object may rotate in a direction (e.g., clockwise or counterclockwise) corresponding to the direction of the extension of the display area of the display 205. In an embodiment, changing the representation of the second image may include changing at least a portion of the color of a visual object in the second image. In an embodiment, changing the representation of the second image may include changing the brightness of at least a portion of a visual object in the second image. In an embodiment, changing the representation of the second image may include applying a visual effect to at least a portion of a visual object in the second image.

For example, referring then to FIG. 19, the processor 120 may display an image 1910 in a first state 1900. For example, in the first state 1900, the electronic device 101 may be in the first state 210. For example, the processor 120 may identify the extension of the display area of the display 205 while the image 1910 is displayed in the first state 1900.

In an embodiment, the processor 120 may, in response to the identification of the extension of the display area of the display 205, change the first state 1900 to a second state 1920 while the display area of the display 205 is extended. For example, in the second state 1920, the electronic device 101 may be in the intermediate state defined through the description of FIG. 2. However, the present disclosure is not limited thereto. For example, in the second state 1920, the processor 120 may change the representation of a second image 1930 displayed in response to the identification, based on a first direction 1925 of the extension of the display area of the display 205. For example, in the second state 1920, the processor 120 may display the second image 1930 extending in a second direction 1935 opposite to the first direction 1925 from the display area newly exposed according to the extension of the display area of the display 205. For example, the second image 1930 may be at least partially superimposed on the first image 1910. For example, since the second image 1930 is at least partially superimposed on the first image 1910, the second image 1930 may be referred to as a masking image. In an embodiment, a speed at which the second image 1930 is extended in the second direction 1935 may be changed depending on the speed at which the display area of the display 205 is extended. For example, when the speed at which the display area of the display 205 is extended is changed as shown in FIG. 3C, the speed at which the second image 1930 is extended may be changed depending on the speed of the extension of the display area of the display 205. The processor 120 may provide the third state 1960 after providing the second state 1920. For example, in the third state 1960, the electronic device 101 may be in the second state 250. However, the present disclosure is not limited thereto. For example, in the third state 1960, the processor 120 may cease displaying the first image 1910 and display the second image 1930. For example, since the second image 1930 extending in the second direction 1935 according to the extension of the display area of the display 205 may be fully superimposed on the first image 1910, the representation of the first image 1910 may be ceased. For another example, the processor 120 may control the representation of the second image 1930 so that the second image 1930 can be fully superimposed on the first image 1910 at the timing when the extension of the display area of the display 205 is completed.

For example, referring now to FIG. 20A, the processor 120 may display a first image 2010 in a first state 2000. For example, in the first state 2000, the electronic device 101 may be in the first state 210. However, the present disclosure is not limited thereto. In some embodiments, the processor 120 may identify an adjustment (e.g., an extension or contraction) of the display area of the display 205 while the first image 2010 is displayed. Although not shown in FIG. 20A, in an embodiment, the first image 2010 may be displayed together with visual information or executable objects for executing software applications respectively. For example, a first image 2010 may be a background image of a lock screen including local time information and/or weather information. As another example, the first image 2010 may be the background image of the wallpaper including the executable objects. For example, the visual information or the executable objects may be superimposed on the first image 2010.

In an embodiment, the processor 120 may change the first state 2000 to a second state 2020 in response to the identification. For example, in the second state 2020, the electronic device 101 may be in the intermediate state defined through the description of FIG. 2. For example, in the second state 2020, the processor 120 may display a second image 2030 extending in a direction 2025 opposite to the direction in which the display area of the display 205 is extended, from a periphery 2022 of the housing of the electronic device 101 from which the display 205 is drawn out. For example, in second state 2020, the second image 2030 may appear from the periphery 2022 and be extended in the direction 2025. In an embodiment, the movement of the second image 2030 extending in the direction 2025 may be distinguished (i.e., different) from the movement of the visual information or the executable objects. For example, as opposed to the second image 2030 extending in the direction 2025, the position of the visual information may be maintained. For another example, as opposed to the second image 2030 extending in the direction 2025, some of the executable objects may be moved in another direction opposite to the direction 2025 so as to be spaced apart from other portions of the executable objects.

In an embodiment, the representation of the second image 2030 may be changed depending on the speed at which the display area of the display 205 is extended. For example, in the second state 2020, the processor 120 may change the representation of the second image 2030, as changing the shape of at least one periphery 2035 of the second image 2030 according to the speed of the extension of the display area of display 205. For example, the at least one periphery 2035 may be at least one periphery in contact with the first image 2010. For example, referring to FIG. 20B, the processor 120 may display at least one periphery 2035 having a first shape 2072 while the display area of the display 205 is extended at a speed 2070, display at least one periphery 2035 having a second shape 2076 with a more pointed shape than the first shape 2072 while the display area of the display

205 is extended at a speed 2074 higher than the speed 2070, and display at least one periphery 2035 having a third shape 2080 with a less pointed shape than the first shape 2072 based on ceasing 2078 of the extension of the display area of the display 205.

Referring again to FIG. 20A, after providing the second state 2020, the processor 120 may provide a third state 2040 according to the extension of the display area of the display 205. For example, in the third state 2040, the electronic device 101 may be in the second state 250. However, the present disclosure is not limited thereto. For example, in the third state 2040, the processor 120 may display the second image 2030 within the entire display area of the display 205. For example, the second image 2030 may be fully superimposed on the first image 2010 according to the extension of the display area of the display 205. As described above, the electronic device 101 may change the representation of the second image displayed in response to the identification of the extension of the display area of the display 205, according to the direction in which the display area of the display 205 is extended, thereby providing a seamless user experience while the display area of the display 205 is extended.

Meanwhile, referring again to FIG. 19, in an embodiment, the processor 120 may change the first state 1900 to a fourth state 1940 while the display area of the display 205 is extended, based on the identification of the extension of the display area of the display 205. For example, in the fourth state 1940, the electronic device 101 may be in the intermediate state defined through the description of FIG. 2. However, the present disclosure is not limited thereto. For example, the processor 120 may change the first state 1900 to the fourth state 1940 after a lapse of a preset time from the timing of identifying the extension of the display area of the display 205. As another example, the processor 120 may change the first state 1900 to the fourth state 1940 on condition that a distance by which the display area of the display 205 is extended reaches a preset distance. For example, in the fourth state 1940, the processor 120 may display the second image 1930 switched from the first image 1910. Although not shown in FIG. 19, the second image 1930 displayed in the fourth state 1940 may have a representation changed according to the extension of the display area of the display 205. For example, the representation of the second image 1930 displayed in the fourth state 1940 may be changed based on the first direction 1925 of the extension of the display area of the display 205. Meanwhile, the processor 120 may provide the third state 1960 after providing the fourth state 1940.

For example, referring now to FIG. 21, the processor 120 may display a wallpaper 2120 including a first image 2110 in a first state 2100. For example, in the first state 2100, the electronic device 101 may be in the first state 210. However, the present disclosure is not limited thereto. In some embodiments, the first image 2110 may be a background image of the wallpaper 2120. The processor 120 may change the first state 2100 to a second state 2130 in response to identifying the extension of the display area of the display 205. For example, in the second state 2130, the electronic device 101 may be in the intermediate state defined through the description of FIG. 2. However, the present disclosure is not limited thereto. For example, in the second state 2130, the processor 120 may display the first image 2110 including visual objects 2135 that is moved along at least one periphery of the first image 2110. For example, in the second state 2130, each of the visual objects 2135 in the first image 2110 may be moved in a direction identified based on a direction in which the display area of the display 205 is extended along the at least one periphery. In some embodiments, the visual objects 2135 may be moved in a same direction as the direction in which the display area of the display 205 is extended.

Meanwhile, the processor 120, in response to the identification of the extension of the display area of the display 205, may determine whether the distance in which the display area of the display 205 is extended reaches a preset distance. For example, while identifying that the distance does not reach the preset distance, the second state 2130 may be provided. The processor 120 may change the second state 2130 to a third state 2140 based on identifying that the distance reaches the preset distance. For example, in the third state 2140, the electronic device 101 may be in the intermediate state defined through the description of FIG. 2. However, the present disclosure is not limited thereto. For example, in the third state 2140, the processor 120 may display the second image 2145 switched from the first image 2110. For example, the second image 2145 may include visual objects 2135 that are moved in a direction identified based on the direction in which the display area of the display 205 is extended along at least one periphery. For example, a movement state of each of the visual objects 2135 in the second image 2145 may be continuous from a movement state of each of the visual objects 2135 in the first image 2110 in the second state 2130.

In an embodiment, the processor 120 may identify completion of the extension of the display area of the display 205 while displaying the second image 2145. The processor 120 may change the third state 2140 to a fourth state 2150 in response to the identification. For example, in the fourth state 2150, the electronic device 101 may be in the second state 250. However, the present disclosure is not limited thereto. In an embodiment, the processor 120, in response to identifying that the distance by which the display area of the display 205 is extended, reaches another preset distance that is longer than the preset distance, may change the third state 2140 to the fourth state 2150. In the fourth state 2150, the processor 120 may cease displaying the visual objects 2135 within the second image 2145. As described above, the electronic device 101 may switch an image while the display area of the display 205 is extended and move a visual object in the image along at least one periphery of the image according to the extension of the display area of the display 205, thereby providing a seamless user experience.

The electronic device according to an embodiment can provide a seamless user experience while the display area is extended, by adaptively changing a representation of an image according to extension of a display area of a rollable display.

As described above, an electronic device according to an embodiment may comprise: a housing; a memory configured to store instructions; a display slidable into the housing or slidable out from the housing; and at least one processor, when the instructions are executed, configured to identify, while an image is displayed in a display area of the display exposed outside the housing, an event in which the display area exposed outside the housing is extended; and change, in response to the identification, a representation of the image based on at least one of a direction in which the display area is extended or a speed at which the display area is extended, while the display area is extended.

In an embodiment, the at least one processor may be, when the instructions are executed, configured to change, while the display area is extended, the representation of the image, as displaying a part of the image by moving the image in the direction, and a speed at which the image is moved may be changed according to the speed at which the display area is extended. In an embodiment, the at least one processor may be, when the instructions are executed, further configured to provide, in response to identifying completion of the extension of the display area, a bounce back effect that moves the image moved in the direction, in another direction opposite to the direction via the display.

In an embodiment, the part of the image may be a part of a user interface of a first software application being executed in a foreground state, the at least one processor may be, when the instructions are executed, further configured to display, while the display area is extended, a part of a user interface of a second software application being executed in a background state within a part of the display area including a first space formed according to the movement of the image and a second space newly exposed according to the extension of the display area, and the part of the user interface of the first software application may be superimposed on another part of the user interface of the second software application while the display area is extended. In an embodiment, the part of the user interface of the second application may be displayed with a blur effect via the display.

In an embodiment, the at least one processor may be, when the instructions are executed, further configured to further display, while the display area is extended, a part of a user interface of a third software application being executed in the background state within the part of the display area, the part of the user interface of the second software application may be superimposed on another part of the user interface of the third software application while the display area is extended, and the second software application may be a software application executed in the foreground state after the third software application is executed in the foreground state.

In an embodiment, the at least one processor may be, when the instructions are executed, further configured to identify, while the display area is extended, whether a distance the image is moved or the display area of the display is extended reaches a preset distance; cease, based on identifying that the distance reaches the preset distance, to move the image while the display area is extended; and further display a remaining part of the image by extending in the direction the image fixed according to the cessation of the movement of the image while the display area is extended.

In an embodiment, the at least one processor may be, when the instructions are executed, further configured to display, while the display area is extended, additional information within a part of the display area including a first space formed according to the movement of the image and a second space newly exposed according to the extension of the display area. In an embodiment, the additional information may comprise at least one of information regarding notifications caused in the electronic device, update information of an operating system (OS) of the electronic device, local time information, weather information, or usage history information of the electronic device. In an embodiment, the image may be a user interface of a software application being executed in a foreground state, and the additional information may comprise information regarding time the software application is executed in the foreground state.

In an embodiment, the at least one processor may be, when the instructions are executed, configured to: change, while the display area is extended, the representation of the image as displaying an animation that moves at least a portion of a visual object in the image, and display, while the display area is extended, another image for providing an animation that moves at least another portion of the visual object extended from the at least portion of the visual object, within a part of the display area newly exposed according to the extension of the display area, and a speed at which the visual object is moved may be changed according to the speed at which the display area is extended.

In an embodiment, the at least one processor may be, when the instructions are executed, configured to change, while the display area is extended, the representation of the image as rotating a visual object in the image having a three-dimensional (3D) shape in a direction corresponding to the direction, and a speed of the rotation may be changed according to the speed at which the display area is extended.

In an embodiment, the at least one processor may be, when the instructions are executed, configured to change, while the display area is extended, the representation of the image, as changing a shape of a visual object in the image from a two-dimensional (2D) shape to a three-dimensional (3D) shape and rotating the visual object having the 3D shape in a direction corresponding to the direction, and a speed of the rotation may be changed according to the speed at which the display area is extended.

In an embodiment, the electronic device may further comprise: a rack gear coupled with the display or a support member supporting the display; a pinion gear; and a motor coupled with the pinion gear via a shaft, and the at least one processor may be, when the instructions are executed, configured to extend, in response to receiving a preset user input, the display area by moving the rack gear in the direction based on rotating the pinion gear using the motor.

As described above, an electronic device according to an embodiment may comprise: a housing; a memory configured to store instructions; a display slidable into the housing or slidable out from the housing; and at least one processor, when the instructions are executed, configured to: identify, while a first image is displayed in a display area of the display exposed outside the housing, an event in which the display area exposed outside the housing is extended; and change, while the display area is extended, a representation of a second image displayed in response to the identification, based on at least one of a direction in which the display area is extended and a speed at which the display area is extended.

In an embodiment, the at least one processor may be, when the instructions are executed, configured to change, while the display area is extended, the representation of the second image, as changing a shape of at least one periphery of the second image extended in another direction opposite to the direction from a display area newly exposed according to the extension of the display area, and the at least one periphery of the second image may be at least one periphery in contact with the first image among peripheries of the second image. In an embodiment, the second image may be at least partially superimposed on the first image according to an extension of the second image in the direction. In an embodiment, the second image may be fully superimposed on the first image, based on completion of the extension of the display area, and each of the first image and the second image may be a background image within a wallpaper including at least one executable object for executing at least one software application.

In an embodiment, the at least one processor may be, when the instructions are executed, configured to: identify, while the display area is extended, whether a distance the display area is extended reaches a preset distance; and change, based on identifying that the distance reaches the preset distance, the representation of the second image, as switching the first image including a visual object moving along at least one periphery of the first image in a direction corresponding to the direction to the second image including the visual object. In an embodiment, the at least one processor may be, when the instructions are executed, further configured to cease to display the visual object in the second image, based on identifying that the distance reaches another preset distance longer than the preset distance.

The electronic device according to various embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may be interchangeably used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a housing including a first housing part and a second housing part movably coupled to the first housing part, wherein the housing is changed between a retracted state and an extended state based on a movement of the second housing part;
memory comprising one or more storage media and storing instructions;
an actuator configured to provide driving force to move the second housing part with respect to the first housing part;
a flexible display supported by the first housing part and the second housing part, wherein a size of a display area of the flexible display exposed to an outside of the housing is changed based on the movement of the second housing part; and
at least one processor comprising processing circuitry, wherein the instructions, when executed by the at least one processor, cause the electronic device to:
while an image is displayed in the display area of the flexible display, identify an event that changes the state of the housing;

in response to the event, control the actuator to move the second housing part with respect to the first housing part to extend the display area of the flexible display;
while the display area of the flexible display is extended,
move the image in a first direction in which the display area is extended; and
based on identifying that a distance in which the image is moved in the first direction reaches a distance threshold, extend the image in a second direction opposite to the first direction.

2. The electronic device of claim 1, wherein the instructions, when executed by the at least one processor, cause the electronic device to:
based on identifying completion of the extension of the display area, provide a bounce back effect that moves the image that is moved in the second direction via the flexible display.

3. The electronic device of claim 2,
wherein the image is a user interface (UI) of a first software application being executed in a foreground state,
wherein the instructions, when executed by the at least one processor, cause the electronic device to:
while the display area is extended, display a portion of a UI of a second software application being executed in a background state within a portion of the display area including a first space formed as a result of the movement of the image and a second space newly exposed as a result of the extension of the display area; and
wherein the portion of the UI of the first software application is superimposed on another portion of the UI of the second software application while the display area is extended.

4. The electronic device of claim 3, wherein the portion of the UI of the second software application is displayed with a blur effect via the flexible display.

5. The electronic device of claim 3, wherein the instructions, when executed by the at least one processor cause the electronic device to:
while the display area is extended, further display a portion of a UI of a third software application being executed in the background state within the portion of the display area;
wherein the portion of the UI of the second software application is superimposed on another portion of the UI of the third software application while the display area is extended; and
wherein the second software application is a software application executed in the foreground state after an execution state of the third software application was changed from the foreground state to the background state.

6. The electronic device of claim 1, wherein the instructions, when executed by the at least one processor cause the electronic device to:
while the display area is extended, move the image in the first direction such that a portion of the image is displayed and a remaining portion of the image is ceased being displayed.

7. The electronic device of claim 6, wherein the instructions, when executed by the at least one processor, cause the electronic device to:
based on identifying that the distance reaches the distance threshold, cease to move the image in the first direction; and further display a remaining portion of the image by extending viewable portions of the image in the second direction.

8. The electronic device of claim 1, wherein the instructions, when executed by the at least one processor, cause the electronic device to:

while the display area is extended, display additional information, within the portion of the display area including a first space formed as a result of a movement of the image and a second space newly exposed as a result of an extension of the display area.

9. The electronic device of claim 8, wherein the additional information includes at least one of information regarding notifications caused in the electronic device, update information of an operating system (OS) of the electronic device, local time information, weather information, or usage history information of the electronic device.

10. The electronic device of claim 8, wherein the image is a UI of a software application being executed in a foreground state, and wherein the additional information includes information regarding a running time the software application has been executed in the foreground state.

11. The electronic device of claim 1, wherein the instructions, when executed by the at least one processor, cause the electronic device to:

change a movement speed of the image based on a rate at which the display area is extended, and wherein, when an extension speed of the display area increases, the movement speed of the image increases.

12. The electronic device of claim 1, wherein the instructions, when executed by the at least one processor, cause the electronic device to:

display, within the image, a visual object, having a three-dimensional (3D) shape, being rotated while the display area is extended, and wherein a rotation speed of the visual object is changed based on the change of an extension speed of the display area.

13. The electronic device of claim 1, wherein the instructions, when executed by the at least one processor, cause the electronic device to:

display, within the image, a visual object having a shape being changed from a two-dimensional (2D) shape to a three-dimensional (3D) shape, wherein the visual object having the 3D shape is rotated while the display area is extended, and wherein a rotation speed of the visual object is changed based on the change of an extension speed of the display area.

14. The electronic device of claim 1, wherein a movement speed of the image in the first direction increases in accordance with an extension speed of the display area.

15. The electronic device of claim 1, wherein the actuator includes a rack gear coupled with the display or a support member supporting the display, a pinion gear, and a motor coupled with the pinion gear via a shaft, wherein the instructions, when executed by the at least one processor, cause the electronic device to:

in response to receiving a user input, extend the display area by moving the rack gear in the first direction based on rotating the pinion gear using the motor.

16. The electronic device of claim 1, wherein the first direction is opposite to a direction in which the display area is extended.

17. The electronic device of claim 1, wherein the instructions, when executed by the at least one processor, cause the electronic device to:

based on the distance in which the image is moved in the first direction being identified as reaching the distance threshold, and information to be displayed while the second housing part is moved with respect to the first housing part being identified, forgo extending the image in the second direction, and display the information within a portion of the display area including a first space formed as a result of the movement of the image and a second space newly exposed as a result of the extension of the display area.

18. The electronic device of claim 1, wherein the instructions, when executed by the at least one processor, cause the electronic device to:

based on the distance in which the image is moved in the first direction being identified as reaching the distance threshold, and information to be displayed while the second housing part is moved with respect to the first housing part being not identified, extend the image in the second direction.

19. The electronic device of claim 1, wherein the instructions, when executed by the at least one processor, cause the electronic device to:

change a movement speed of the image based on a rate at which the display area is extended, and wherein an extension speed of the display area is gradually increased until the distance reaches the distance threshold.

20. A method executed in an electronic device comprising a housing including a first housing part and a second housing part movably coupled to the first housing part, wherein the housing is changed between a retracted state and an extended state based on a movement of the second housing part, an actuator configured to provide driving force to move the second housing part with respect to the first housing part, and a flexible display supported by the first housing part and the second housing part, wherein a size of a display area of the flexible display exposed to an outside of the housing is changed based on the movement of the second housing part, the method comprising:

while an image is displayed in the display area of the flexible display, identifying an event that changes the state of the housing;

in response to the event, controlling the actuator to move the second housing part with respect to the first housing part to extend the display area of the flexible display;

while the display area of the flexible display is extended, moving the image in a first direction in which the display area is extended; and based on identifying that a distance in which the image is moved in the first direction reaches a distance threshold, extending the image in a second direction opposite to the first direction.

21. The method of claim 20, wherein a movement speed of the image in the first direction increases in accordance with an extension speed of the display area.

* * * * *